(12) United States Patent
Marsilio et al.

(10) Patent No.: US 7,614,601 B2
(45) Date of Patent: Nov. 10, 2009

(54) CENTERING MECHANISM WITH SELF-ORIENTED MOUNTING AREA

(75) Inventors: Ronald M. Marsilio, Lake Wiley, SC (US); Dennis D. Belden, Jr., Canton, OH (US)

(73) Assignee: Invue Security Products Inc., Charlotte, NC (US)

( * ) Notice: Subject to any disclaimer, the term of this patent is extended or adjusted under 35 U.S.C. 154(b) by 176 days.

(21) Appl. No.: 11/507,300

(22) Filed: Aug. 21, 2006

(65) Prior Publication Data

US 2007/0145211 A1 Jun. 28, 2007

Related U.S. Application Data

(63) Continuation-in-part of application No. 11/431,291, filed on May 10, 2006.

(60) Provisional application No. 60/754,138, filed on Dec. 27, 2005.

(51) Int. Cl.
*F16M 13/00* (2006.01)

(52) U.S. Cl. ................. 248/551; 340/568.8; 248/178.1; 248/187.1

(58) Field of Classification Search ............... 248/177.1, 248/178.1, 187.1, 551, 206.5, 229.11, 176.3, 248/298.1, 346.06, 424, 429; 340/568.1, 340/568.8, 572.6; 396/419, 422, 425, 428
See application file for complete search history.

(56) References Cited

U.S. PATENT DOCUMENTS

| | | | | |
|---|---|---|---|---|
| 3,423,056 A * | 1/1969 | Welt | ........................ | 248/187.1 |
| 4,570,887 A * | 2/1986 | Banister | ................... | 248/187.1 |
| 5,146,205 A * | 9/1992 | Keifer et al. | ............. | 340/568.2 |
| 5,230,490 A * | 7/1993 | Sloop | ....................... | 248/187.1 |
| 5,429,332 A * | 7/1995 | Ishikawa | ................. | 248/187.1 |
| 5,861,807 A * | 1/1999 | Leyden et al. | ............ | 340/568.2 |
| 6,108,108 A * | 8/2000 | Peng | .......................... | 358/497 |
| 6,196,504 B1* | 3/2001 | Lemke | ..................... | 248/187.1 |
| 6,476,717 B1* | 11/2002 | Gross et al. | .............. | 340/568.1 |
| 6,663,073 B1 | 12/2003 | Church | | |
| 6,700,488 B1* | 3/2004 | Leyden et al. | ............ | 340/568.1 |
| 6,756,900 B2* | 6/2004 | Leyden et al. | ............ | 340/568.4 |
| 6,761,579 B2* | 7/2004 | Fort et al. | ................... | 439/501 |
| 6,896,543 B2* | 5/2005 | Fort et al. | ................... | 439/501 |
| 7,185,862 B1* | 3/2007 | Yang | ...................... | 248/187.1 |
| 7,209,038 B1* | 4/2007 | Deconinck et al. | ....... | 340/568.8 |

* cited by examiner

*Primary Examiner*—A. Joseph Wujciak, III
(74) *Attorney, Agent, or Firm*—Christopher C. Dremann, P.C.

(57) ABSTRACT

A device for displaying a display item includes a mounting member which includes a first mounting element and a second mounting element which is mountable on the display item and movable relative to the first mounting element between different display positions to position the display item as desired, typically to center the display item. The first mounting element includes a base and lid which define an interior chamber and an elongated entrance opening. The second mounting element is disposed within the interior chamber and extends through the entrance opening. The base and lid close to secure the second mounting element relative to the first mounting element. The mounting member may be mounted on a base and removable therefrom for handling and viewing of the display item. An alignment mechanism may be provided for automatically moving the mounting member when on the base from an unaligned orientation to a display orientation.

45 Claims, 23 Drawing Sheets

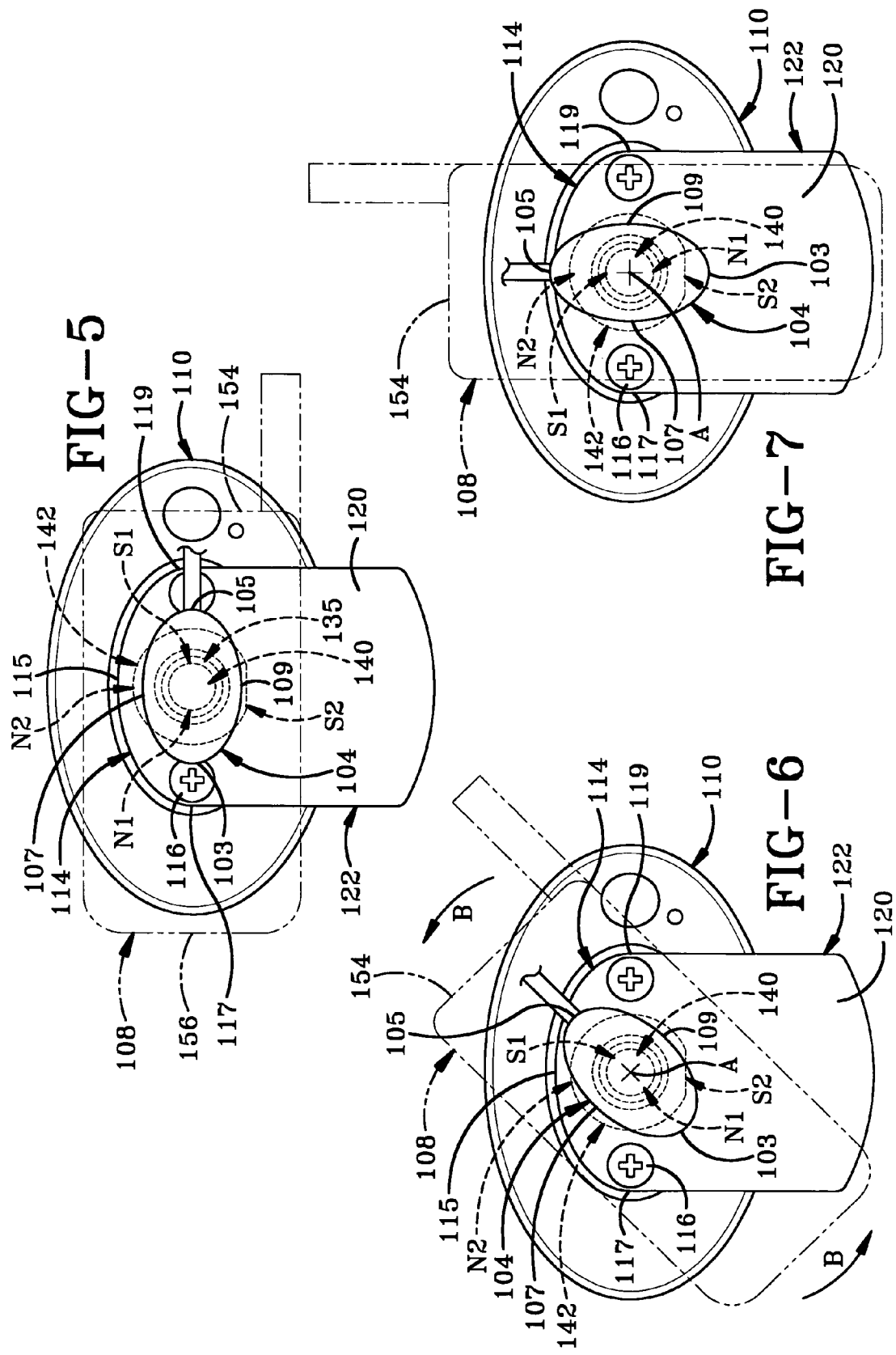

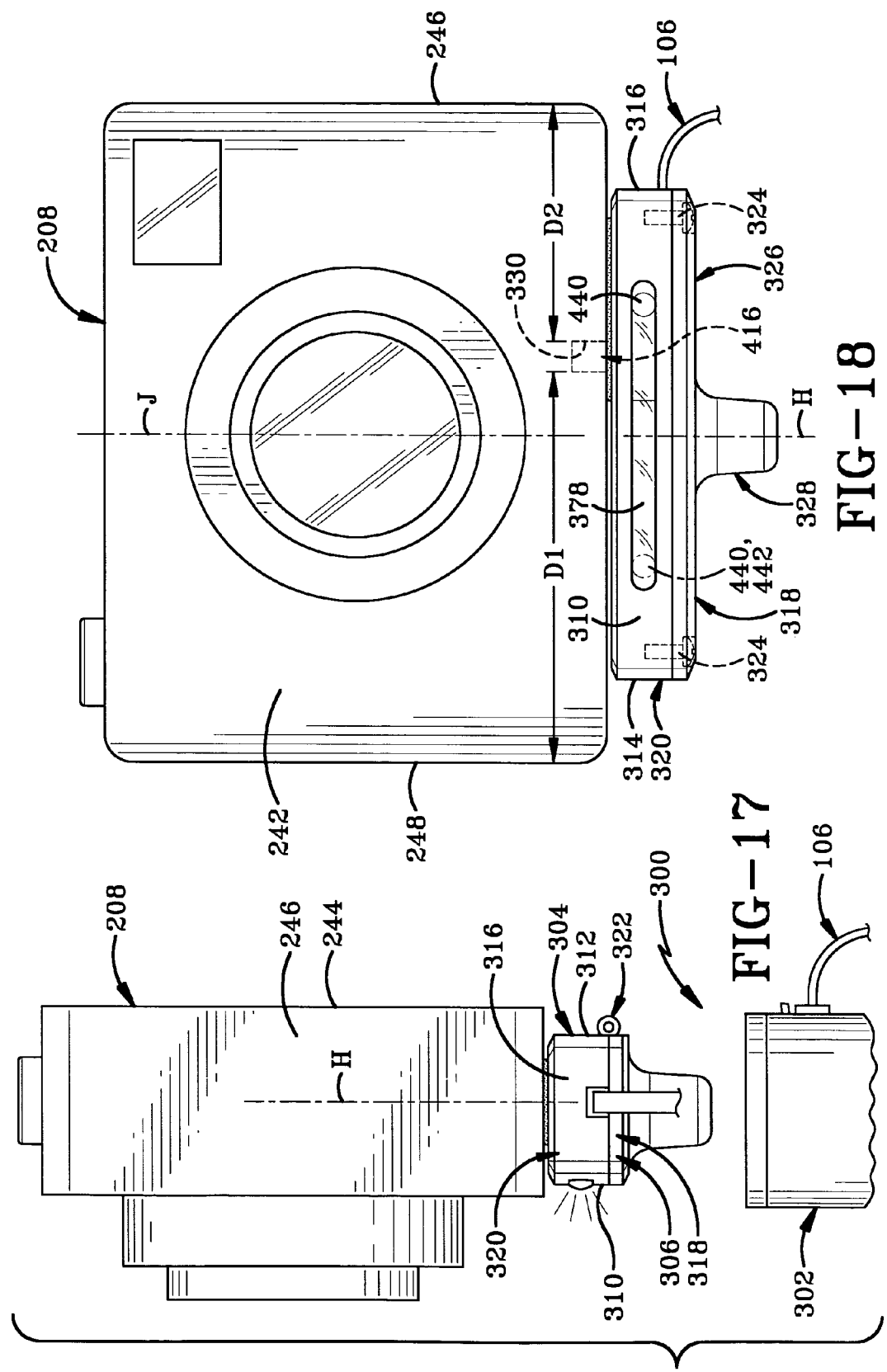

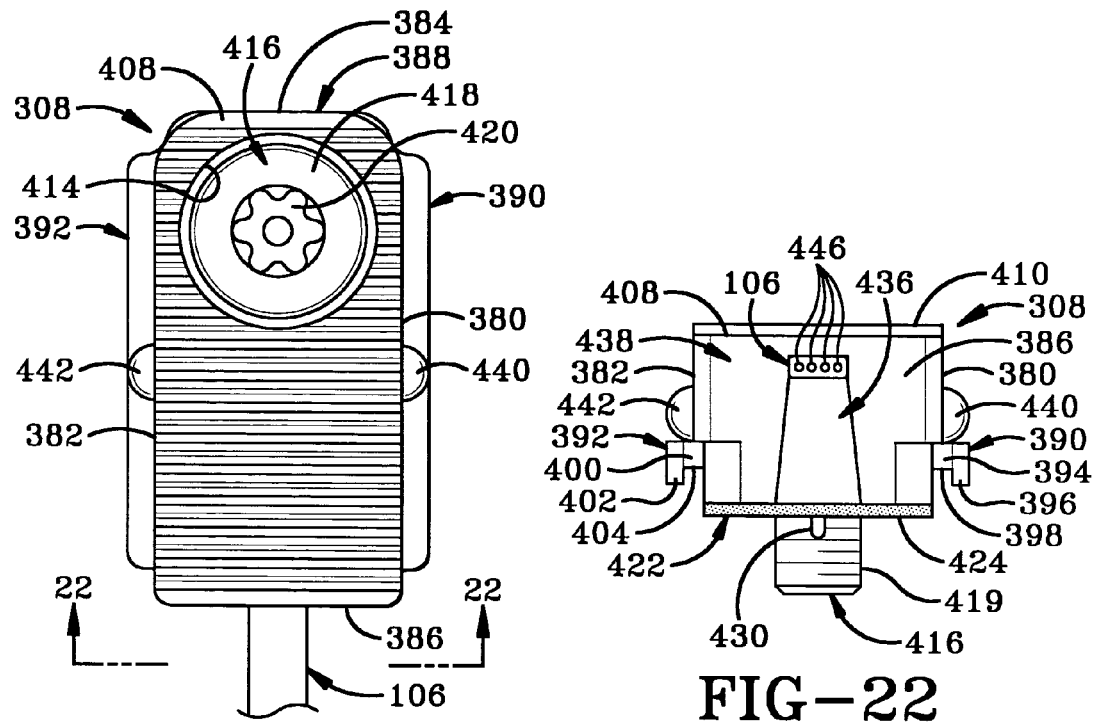
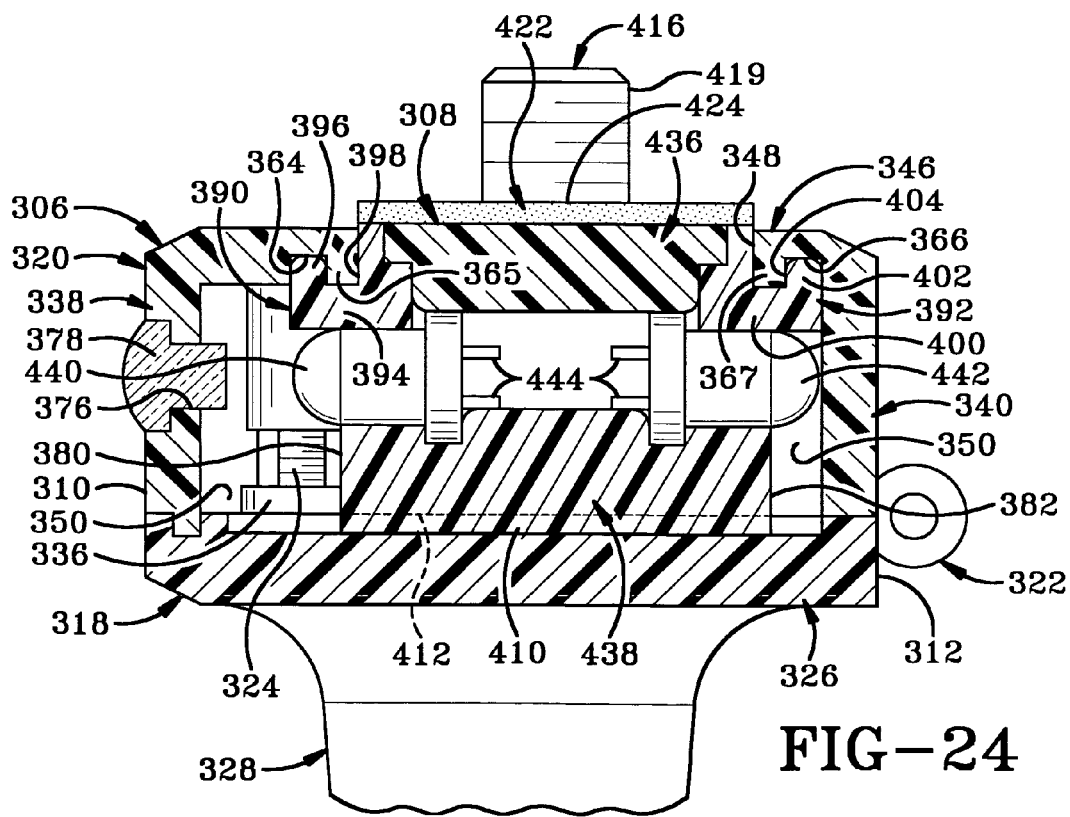

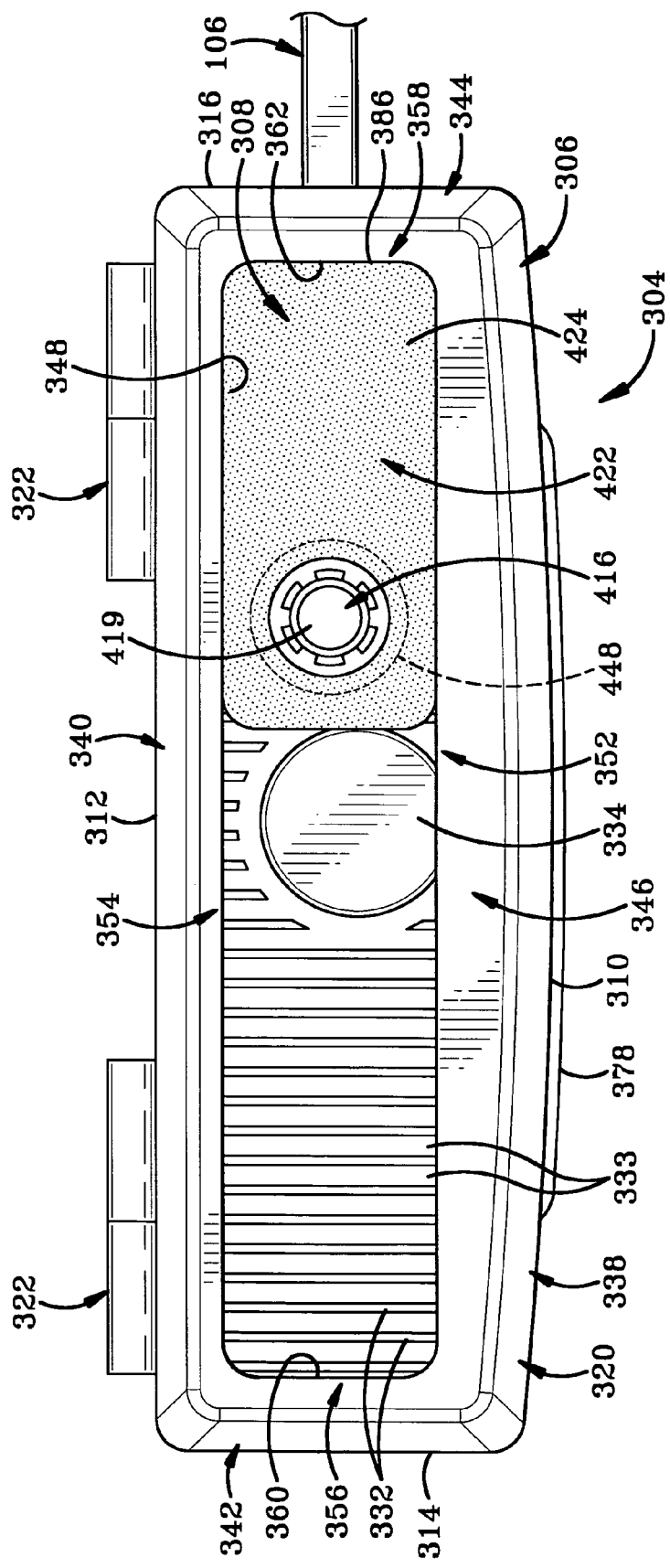

US 7,614,601 B2

CENTERING MECHANISM WITH SELF-ORIENTED MOUNTING AREA

CROSS REFERENCE TO RELATED APPLICATIONS

This application is a continuation-in-part of U.S. patent application Ser. No. 11/431,291 filed May 10, 2006 which claims priority from U.S. Provisional Application Ser. No. 60/754,138 filed Dec. 27, 2005; the disclosure of which is incorporated herein by reference.

BACKGROUND OF THE INVENTION

1. Technical Field

The invention relates generally to display stands for merchandise. More particularly, the invention relates to a display stand which allows the handling of an item of merchandise. Specifically, the invention relates to such a display stand which orients the item of merchandise to a desired display orientation after the handling thereof.

2. Background Information

Amongst the great variety of display structures used to display items of merchandise are those which allow a potential customer to handle and view the item of merchandise in order to determine if it has characteristics desirable to the potential customer. This is commonly the case for displaying various types of electronic articles such as cell phones, cameras and the like which have a reasonably high unit value but which a retailer desires to allow the potential customer to handle without seeking a store employee simply to unlock the merchandise for such viewing and handling. In addition to the need to provide security against theft of such items, there is also a need to display the items of merchandise in an orderly manner. This often becomes a problem when a potential customer picks up an item of merchandise such as a cell phone or camera in order to look it over and see how it feels, and then places the item generally in the display area from which it was obtained but in a haphazard manner. Especially because multiple items of such merchandise are displayed near one another, when they are all replaced haphazardly, it creates quite a disorderly appearance. The present invention addresses this and other problems.

BRIEF SUMMARY OF THE INVENTION

The present invention provides a device for displaying a display item having an item mounting location, the device comprising a mounting member comprising: a first mounting element having first and second opposed sides and a longitudinal direction extending from the first side to the second side; and a second mounting element comprising a first mounting location adapted to connect to the item mounting location; wherein the second mounting element is movably mounted on the first mounting element to move in the longitudinal direction relative to the first mounting element between a plurality of display positions.

BRIEF DESCRIPTION OF THE SEVERAL VIEWS OF THE DRAWINGS

FIG. 5 is a top plan view with portions cut away showing the mounting member and item of merchandise in dot dashed lines seated on the base in the unaligned orientation.

FIG. 6 is similar to FIG. 5 and shows the mounting member and article of merchandise rotating away from the position shown in FIG. 5 toward the aligned display orientation.

FIG. 7 is similar to FIG. 6 and shows the mounting member and item of merchandise in the aligned display orientation.

FIG. 17 is a side elevational view showing the upper portion of the base with the camera and mounting member removed from the base.

FIG. 18 is a front elevational view of the camera mounted on the mounting member.

FIG. 19 shows a front elevational view of the lower portion of the camera, the lid of the first mounting element and the second mounting element; and a top plan view of the base of the first mounting element.

FIG. 21 is a bottom plan view of the second mounting element.

FIG. 22 is a sectional view taken on line 22-22 of FIG. 21.

FIG. 24 is a sectional view taken on line 24-24 of FIG. 23.

FIG. 25 is a top plan view of the assembled mounting member as indicated by line 25-25 of FIG. 23.

FIG. 26 also shows the base and lid opened with the base shown in a bottom plan view. The camera and the second mounting element are shown sliding from an unaligned off center position (solid lines) to an aligned centered position in phantom.

Similar numbers refer to similar parts throughout the drawings.

DETAILED DESCRIPTION OF THE INVENTION

Figure 1:
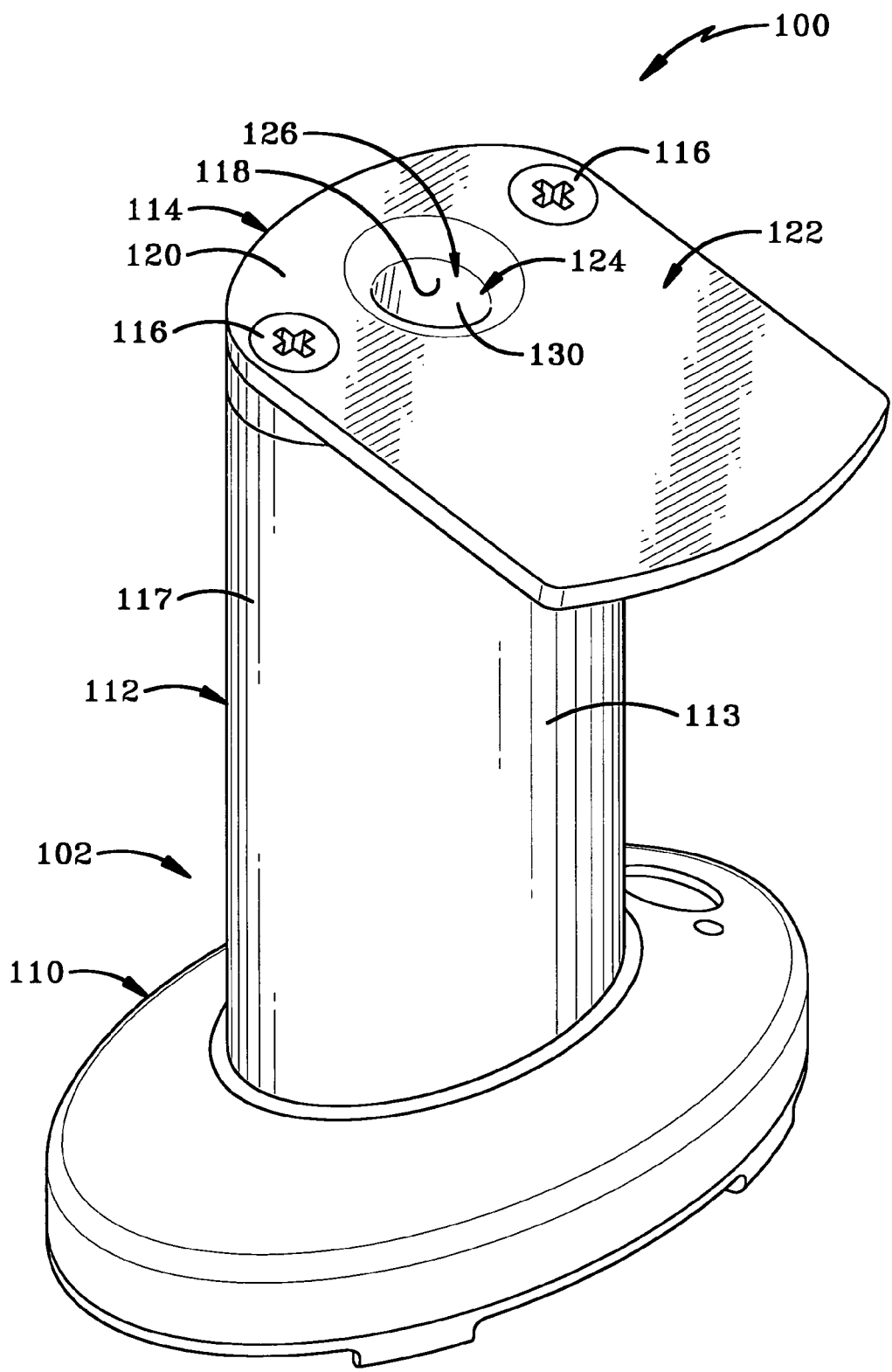
FIG. 1 is a perspective view of a first embodiment of the base of the display device of the present invention.
Figure 2:
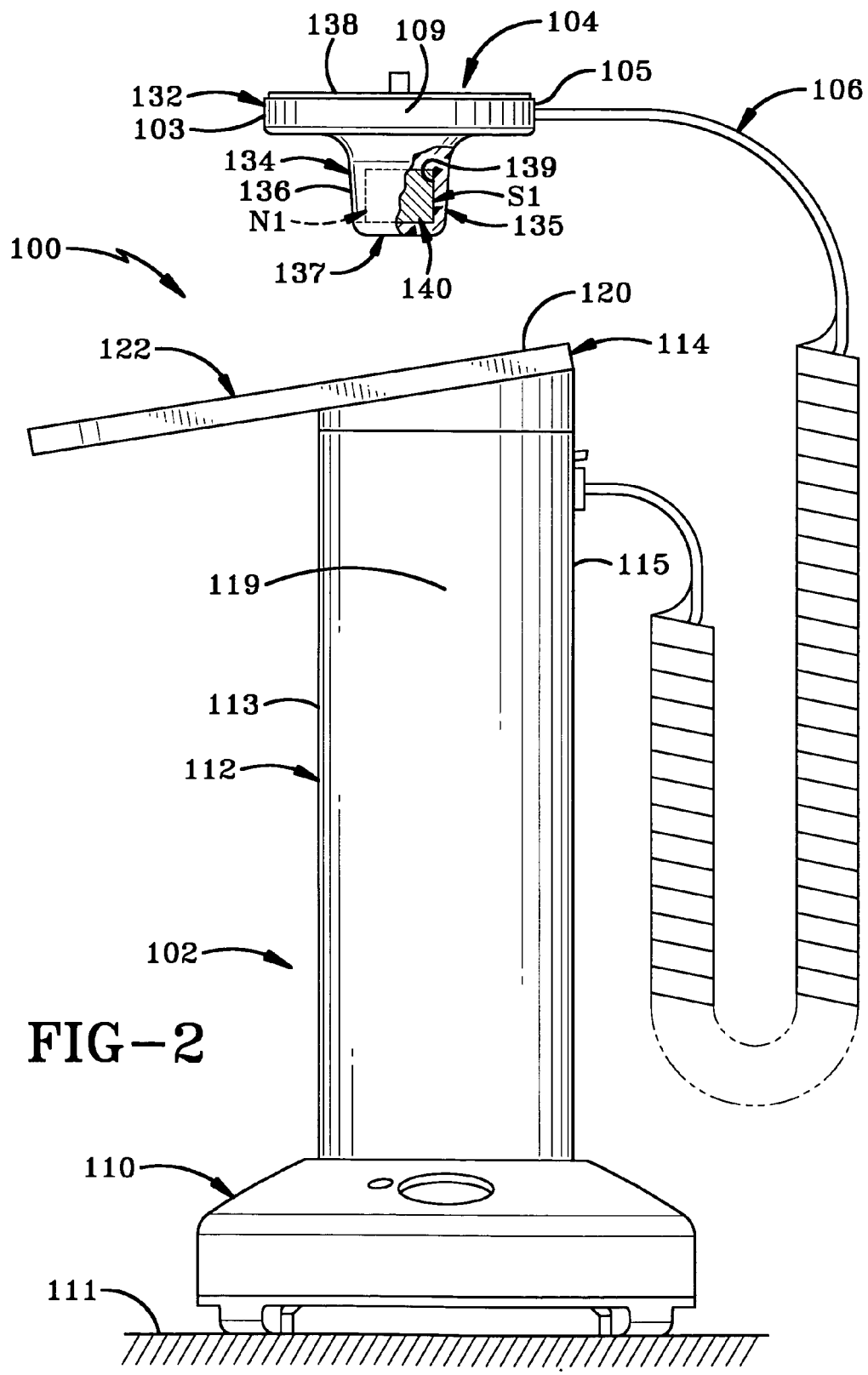
FIG. 2 is a side elevational view of the first embodiment of the display device.
Figure 3:
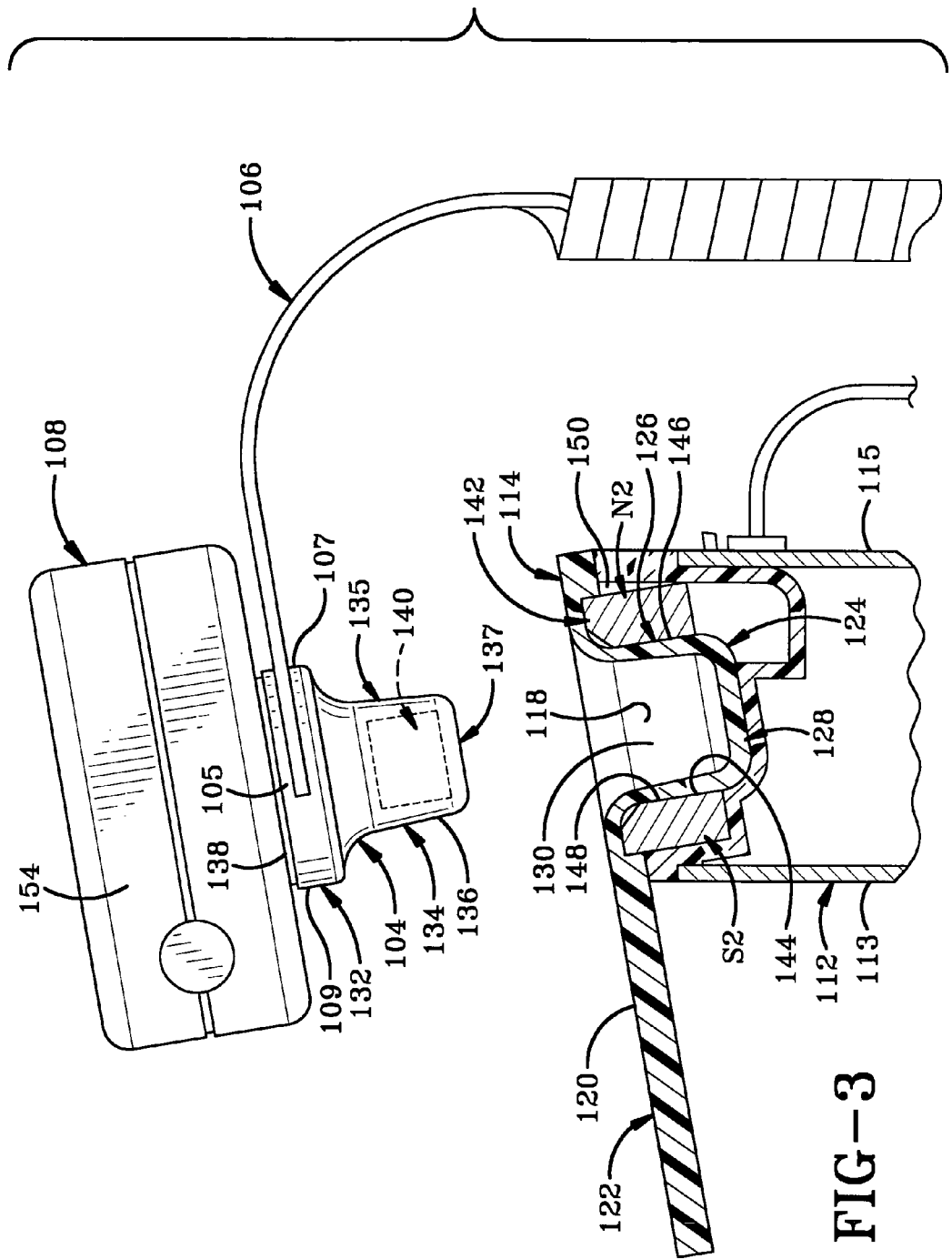
FIG. 3 is a fragmentary exploded view with portions in section showing the mounting member with an item of merchandise mounted thereon and removed from the base.
Figure 9:
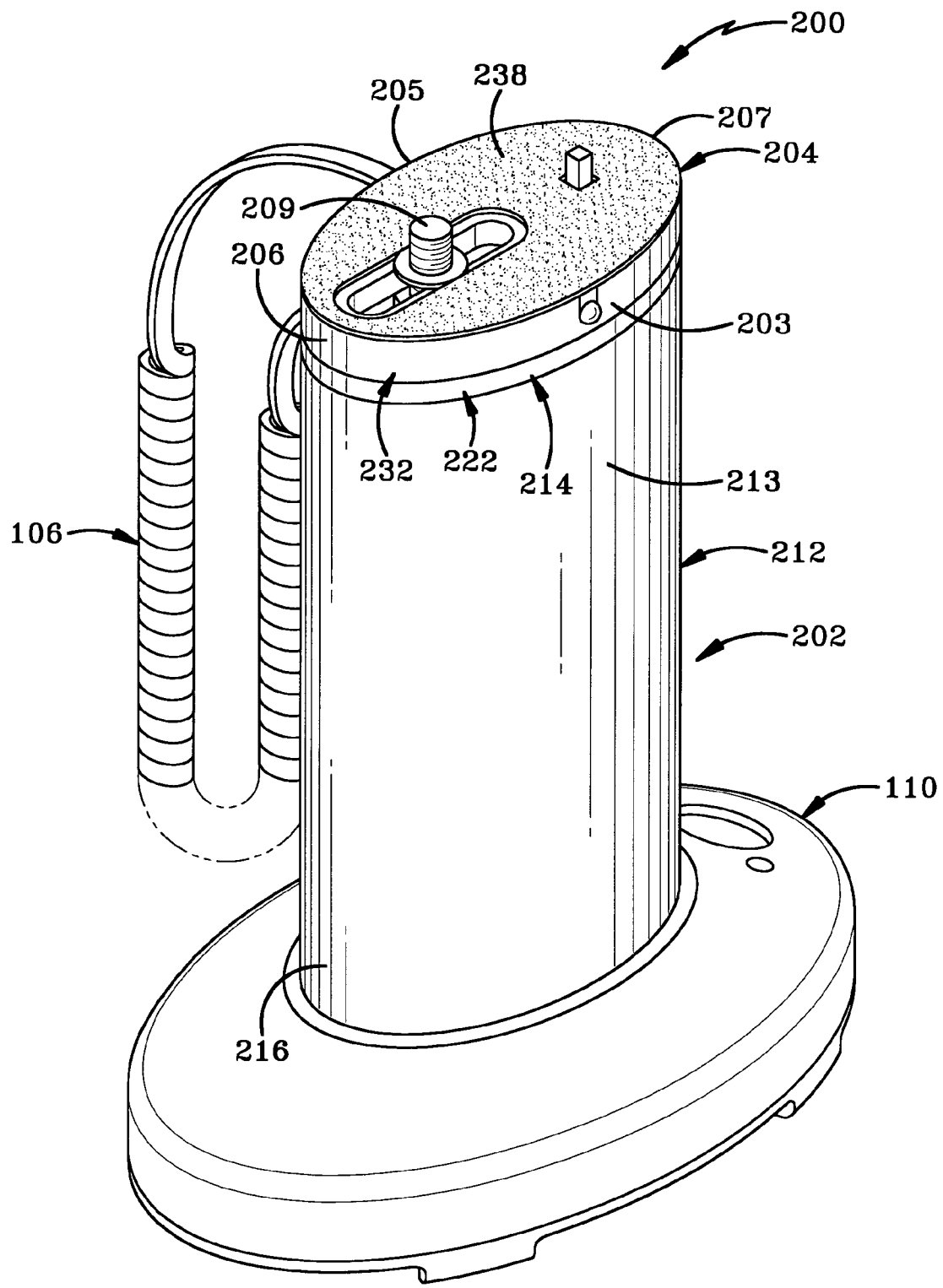
FIG. 9 is a perspective view of a second embodiment of the display device of the present invention showing the mounting member mounted on the base.
Figure 10:
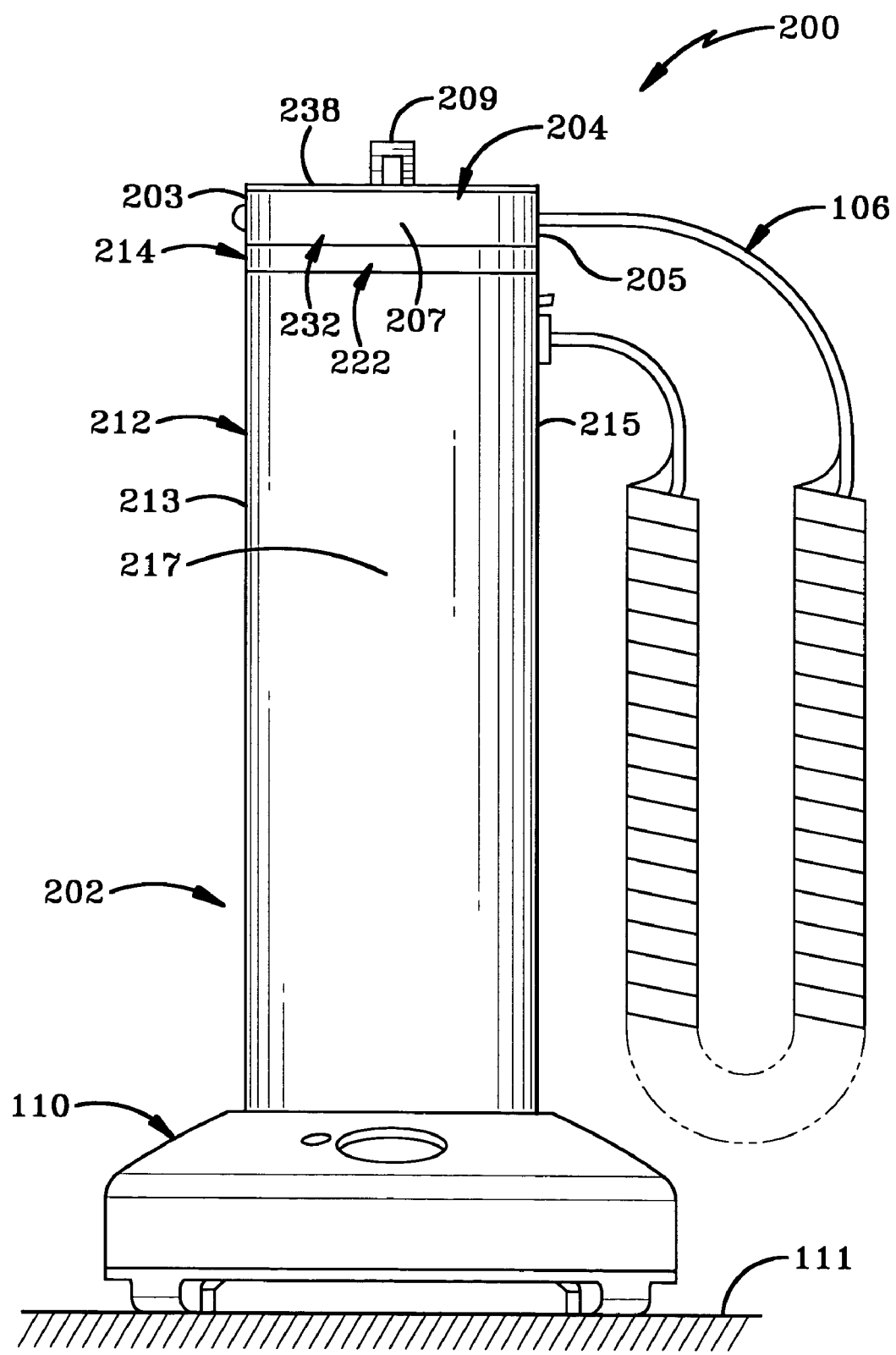
FIG. 10 is a side elevational view of the display device shown in FIG. 9.
Figure 11:
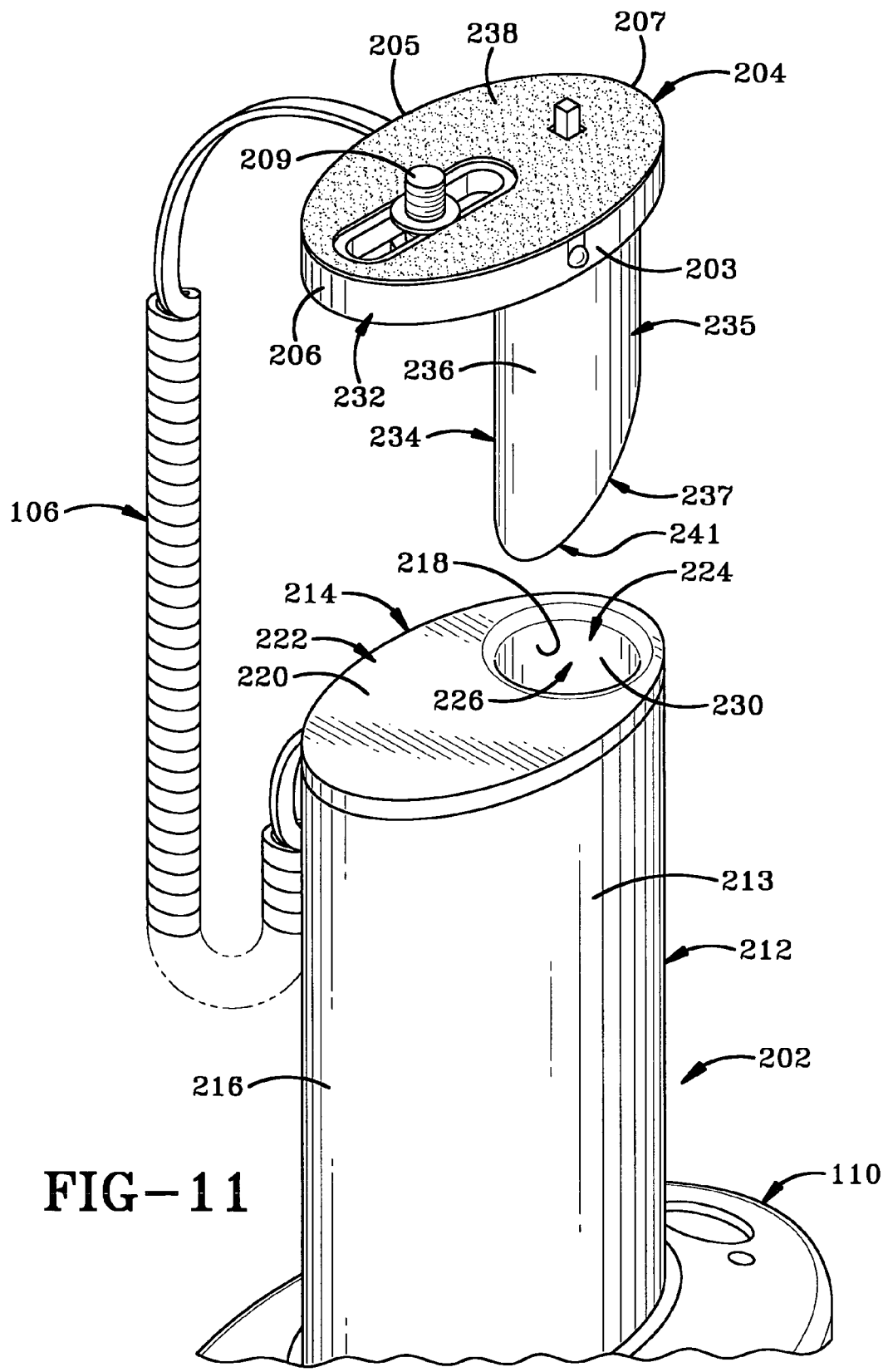
FIG. 11 is a fragmentary perspective view of the second embodiment showing the mounting member removed from the base.
Figure 16:
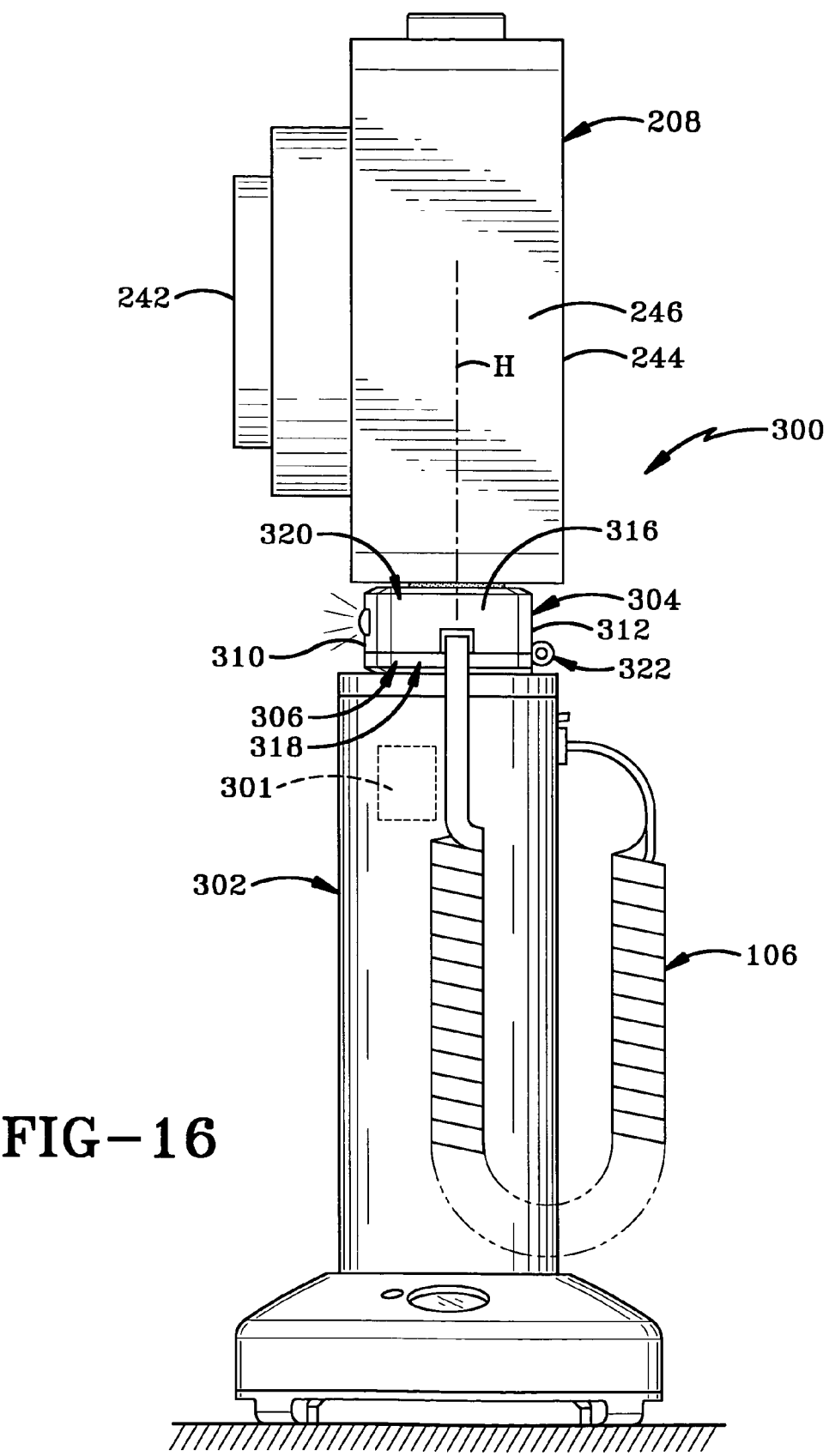
FIG. 16 is a side elevational view of a third embodiment of the stand of the present invention showing the camera mounted on the mounting member and the mounting member mounted on the base.

A first embodiment of the display assembly or display stand of the present invention is indicated generally at 100 in FIGS. 1-2; and a second embodiment is indicated generally at 200 in FIGS. 9-11; and a third embodiment is indicated generally at 300 in FIGS. 16-18. Referring to FIGS. 1-2, stand 100 includes a base 102, a mounting member 104 which is removably mountable on base 102 and a tether 106 which is connected to and extends between base 102 and mounting member 104. Mounting member 104 has a front 103, an opposed rear 105 and first and second sides 107 and 109, which are noted herein primarily as points of reference to clarify the movement of mounting member 104 as later detailed. Mounting member 104 is configured for mounting thereon an item of merchandise or display item such as cell phone 108 (FIG. 3) in order to allow the item of merchandise to be moved away from base 102 in order to view and handle said item. Base 102 includes a foundation 110 which is seated on a support surface 111, an upwardly projecting column 112 which extends upwardly from foundation 110 and a seating member 114 which is connected to a top end of column 112 via a pair of fasteners in the form of screws 116. Column 112 has a front, an opposed rear 115 and first and second opposed sides 117 and 119, which are also noted herein primarily as points of reference to clarify the movement of mounting member 104 as detailed below.

Seating member 114 defines an opening 118 which extends downwardly from an upper surface 120 of seating member 114. More particularly, seating member 114 includes a substantially flat seating plate 122 and a cup-shaped member 124. Cup-shaped member 124 includes a cylindrical side wall 126 which extends downwardly from plate 122 and a bottom wall 128 (FIG. 3) connected to side wall 126 from which side wall 126 extends upwardly. Cup-shaped member 124 has a smooth inner surface 130.

Mounting member 104 includes a merchandise mounting portion 132 and a base mounting portion in the form of a post 134 which extends downwardly from portion 132. Post 134 includes a cylindrical or frustoconical side wall 135 extending downwardly from mounting portion 132 and a bottom wall 137 connected to side wall 135 such that side wall 135 and bottom wall 137 define therein an interior chamber 139. Sidewall 135 has a generally frustoconical or cylindrical outer surface 136 of a mating configuration with inner surface 130 of cup-shaped member 124. Outer surface 136 is smooth so that friction between surface 136 and surface 130 is reduced to facilitate slidable engagement therebetween when post 134 is disposed in opening 118. Mounting portion 132 has an upper surface 138 on which cell phone 108 is mountable.

In accordance with a feature of the invention, a first magnet 140 is disposed within interior chamber 139 of post 134 and a second magnet 142 (FIG. 3) is mounted on base 102 adjacent and external to cup-shaped member 124. First magnet 140 has a north pole N1 and a south pole S1. Second magnet 142 is a ring magnet which defines a central magnet opening 144 in which side wall 126 of cup-shaped member 124 is disposed with an outer surface 146 of side wall 126 abutting an inner surface 148 of magnet 142. Magnet 142 is mounted within an interior chamber 150 defined by column 112 adjacent an upper end thereof. Second magnet 142 has a north pole N2 and a south pole S2 which magnetically attract respectively south pole S1 and north pole N1 of first magnet 140 to align mounting member 104 and cell phone 108 when mounted thereon in an aligned display orientation when post 134 is disposed within opening 118 of base 102. In addition, repelling forces are also provided between south poles S1 and S2 and between north poles N1 and N2 which assist in the rotation of mounting member 104 and cell phone 108 to the aligned display orientation.

Tether 106 is preferably of a configuration which allows for extension and retraction thereof, such as a coiled wire, here shown as a standard telephone cord. Tether 106 may thus also provide electrical communication between base 102 and mounting member 104 to, for example, provide a security alarm should cell phone 108 be removed from mounting member 104 or should the electrical connection provided by tether 106 be compromised in some fashion. Base 102 may be free standing although it is generally preferable that base 102 be secured to support surface 111.

Figure 4:
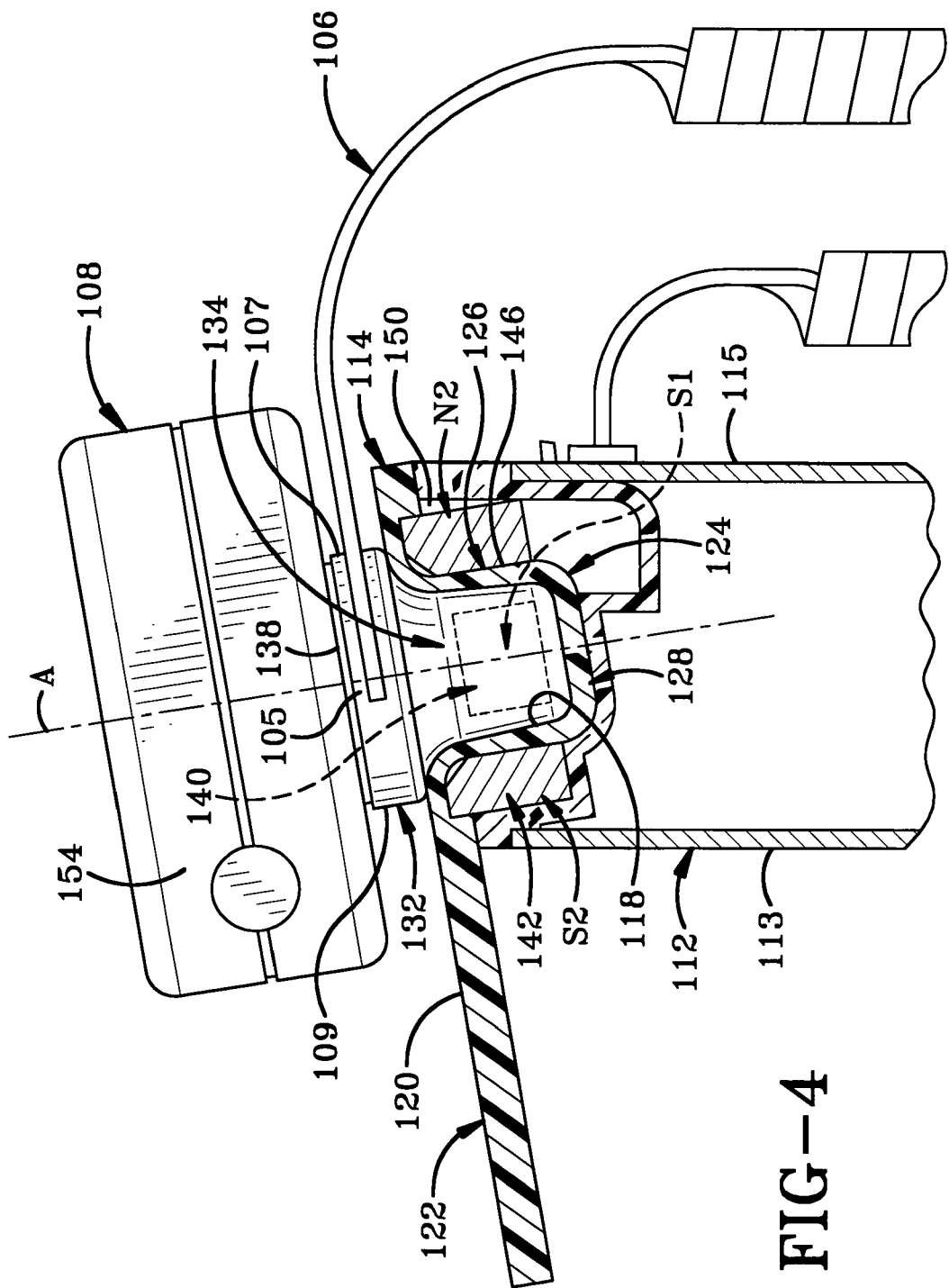
FIG. 4 is similar to FIG. 3 and shows the mounting member seated on the base.

The operation of display stand 100 is described with reference to FIGS. 4-8. FIG. 4 shows mounting member 104 mounted on base 102 with post 104 disposed in opening 118 in an unaligned orientation. More particularly, north and south poles N1 and S1 of first magnet 140 are not respectively aligned with south and north poles S2 and N2 of second magnet 142. As shown in FIG. 4, south pole S1 of first magnet 140 is generally offset approximately 90° from north pole N2 of second magnet 142. As seen in FIG. 4, rear 105 of member 104 is generally aligned with south pole S1 of first magnet 140 and is thus approximately 90° offset from either of north pole N2 and south pole S2 of magnet 142. In addition, a top 154 and bottom 156 of cell phone 108 provide reference points. FIG. 4 shows top 154 also generally aligned with rear 105 of member 104 and south pole S1 of first magnet 140. FIG. 5 shows mounting member 104 and cell phone 108 from above in the unaligned orientation as shown in FIG. 4.

Figure 8:
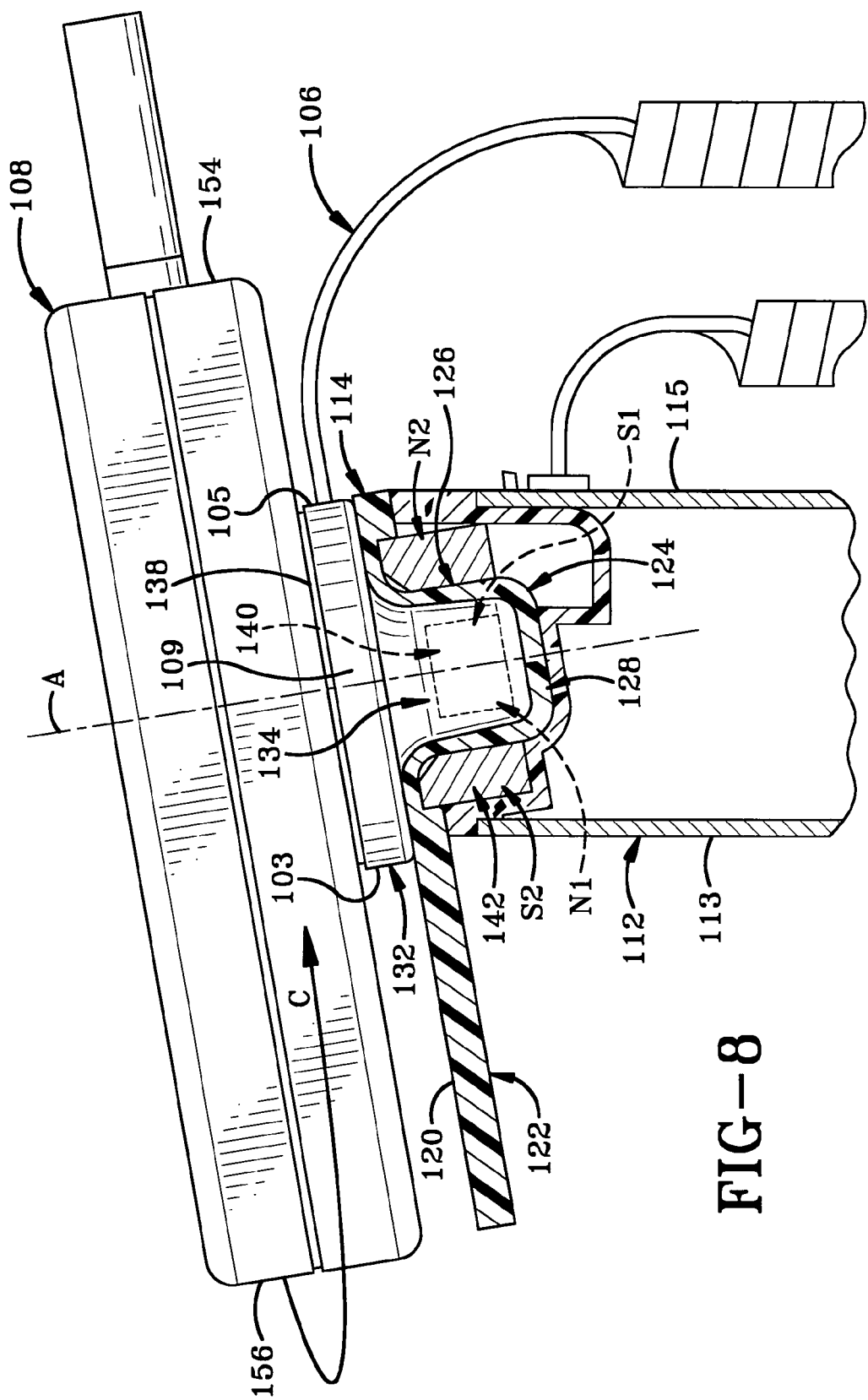
FIG. 8 is a fragmentary side elevational view with portions in section showing the mounting member and item of merchandise having rotated to the aligned display orientation.

FIG. 6 shows rotation of mounting member 104 and cell phone 108 (Arrows B) about an axis A which passes centrally through post 134. Said rotation is in response to the magnetic attraction between respective north and south poles N1 and S1 of first magnet 140 and south and north poles S2 and N2 of second magnet 142 and repulsion between like poles. FIG. 7 shows mounting member 104 and cell phone 108 having been rotated completely to the aligned display orientation. FIG. 8 shows mounting member 104 and cell phone 108 having rotated as indicated at Arrow C to the aligned display orientation so that north and south poles N1 and S1 of first magnet 140 are respectively aligned with south and north poles S2 and N2 of second magnet 142. This rotational movement of mounting member 104 and phone 108 occurs automatically simply by releasing mounting member 104 with post 134 in opening 118 without any additional force necessary beyond the magnetic attraction and repulsion described above. While it is possible to provide a magnetic field via the use of an electric current, it is preferred to utilize permanent magnets such as magnets 140 and 142 to provide a simple and cost efficient magnetically operable alignment mechanism.

Referring to FIGS. 9-10, display stand 200 is now described. Display stand 200 is similar to stand 100 in that it includes a base 202, a mounting member 204 and tether 106. Mounting member 204 is configured for mounting thereon an item of merchandise in the form of a camera 208 (FIG. 12) via a fastener 209 such as a screw or a bolt shown here extending through an elongated opening formed in mounting member 204. Any suitable mounting mechanism known in the art may be used for mounting an item of merchandise to mounting member 204. Mounting member 204 has a front 203, a rear 205 opposed thereto and first and second opposed sides 206 and 207. Base 202 is similar to base 102 in that it includes a foundation 110 and a column 212 which is similar to column 112. Column 212 has a front 213, a rear 215 opposed thereto and first and second opposed sides 216 (FIG. 11) and 217. Base 202 further includes a seating member 214 which is mounted atop column 212 via adhesive, sonic welding or any other suitable means known in the art.

Figure 12:
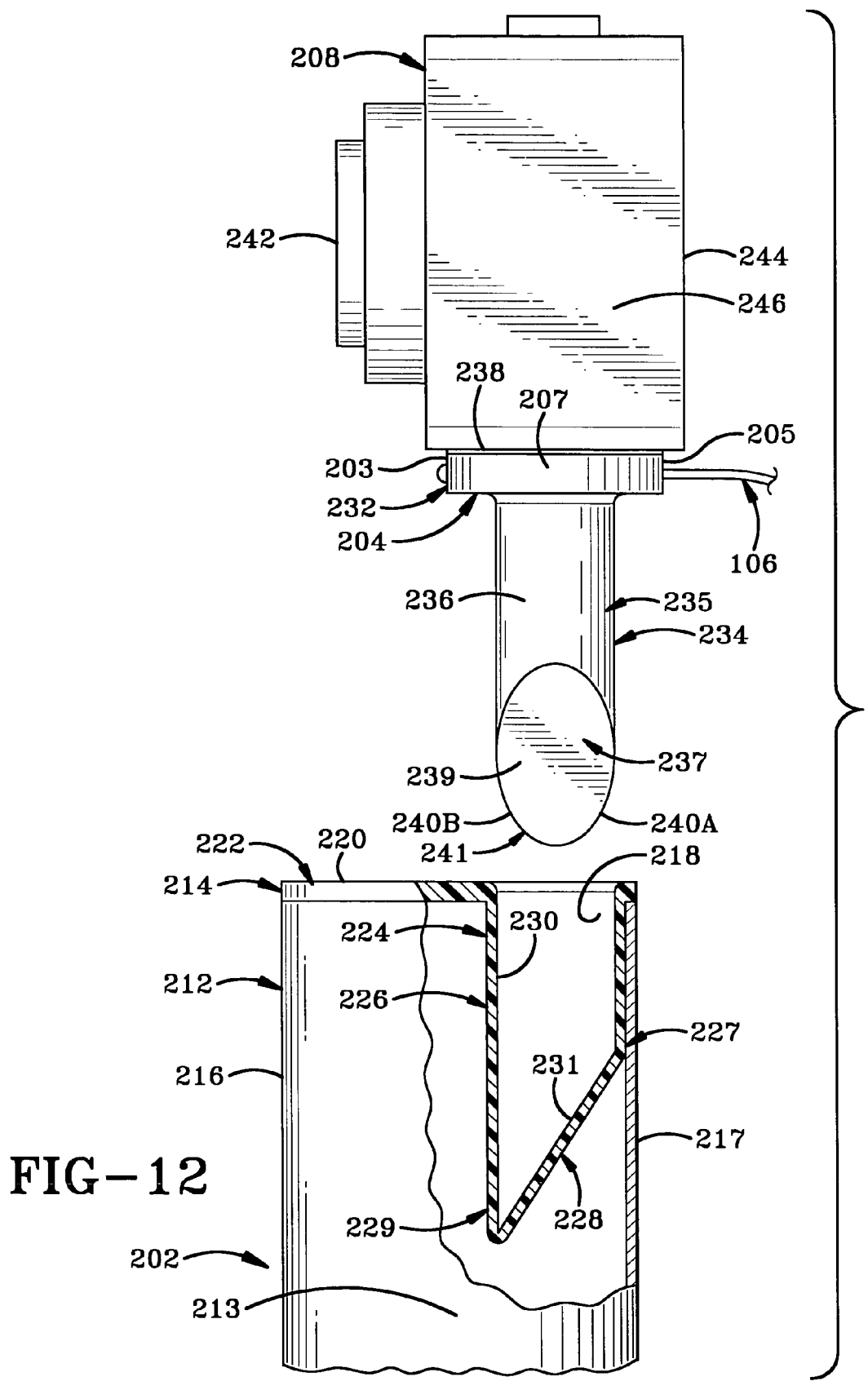
FIG. 12 is a side elevational view of the second embodiment with portions cut away to show a sectional view of portions of the base which form the opening therein, the mounting member with an article of merchandise mounted thereon with the post of the mounting member disposed above the opening in the base.

With reference to FIGS. 11-12, seating member 214 defines an opening 218 which extends downwardly from an upper surface 220 of member 214. More particularly, seating member 214 includes a seating plate 222 which defines flat upper surface 220. Member 214 further includes a cup-shaped member 224 extending downwardly from plate 222 in the form of a truncated cylinder. More particularly, member 224 includes a substantially cylindrical side wall 226 extending downwardly from plate 222 and an angled bottom wall 228 which in particular angles downwardly from a first side 227 of side wall 226 to a second opposed side 229 of side wall 226. Bottom wall 228 is substantially flat and has an oval shape. Cup-shaped member 224 has an inner surface 230 which is preferably smooth to promote slidable engagement with minimal friction between surface 230 and post 234. Inner surface 230 includes an inner or upper surface 231 of bottom wall 228. Upper surface 231 is substantially flat, angles downwardly from adjacent first side 227 to adjacent second side 229 of side wall 226 and is substantially oval in shape. Opening 218 is thus an interior chamber bounded by inner surface 230 of side wall 226 and bottom wall 228.

Mounting member 204 includes a merchandise mounting portion 232 having an upper surface 238 and a base mounting portion in the form of a post 234 which is connected to and extends downwardly from portion 232. Post 234 includes a substantially cylindrical side wall 235 having a substantially cylindrical and thus convex outer surface 236 which is smooth to promote easy sliding engagement with inner surface 230 of cup-shaped member 224. Post 234 further includes a substantially flat oval-shaped bottom wall 237 having a lower surface 239 which angles in a mating configuration with upper surface 231 of bottom wall 228 of cup-shaped member 224. Bottom wall 237 has an oval-shaped outer perimeter 241 lying along outer surface 236 of sidewall 235. Post 234 adjacent its lower end has first and second arcuate camming surfaces 240A and 240B which are located on perimeter 241 at the intersection of side wall 235 and bottom wall 237. Camming surfaces 240A and 240B alternately work in conjunction with upper surface 231 of bottom wall 228 in order to rotate mounting member 204 and camera 208 to the aligned displayed orientation as discussed further below. Each camming surface 240 is an arcuate surface which runs along the lower end of side wall 235. Each camming surface 240 is an arc of the oval outer perimeter 241 formed by the truncation of cylindrical side wall 235.

Operation of display stand 200 is described with reference to FIGS. 12-15. FIG. 12 shows mounting member 204 in the removed position with camera 208 mounted thereon. A front 242, rear 244 and opposed sides 246 and 248 (FIG. 15) of camera 208 may be used as reference points to clarify movement of mounting member 204 and camera 208 to an aligned display orientation.

Figure 13:
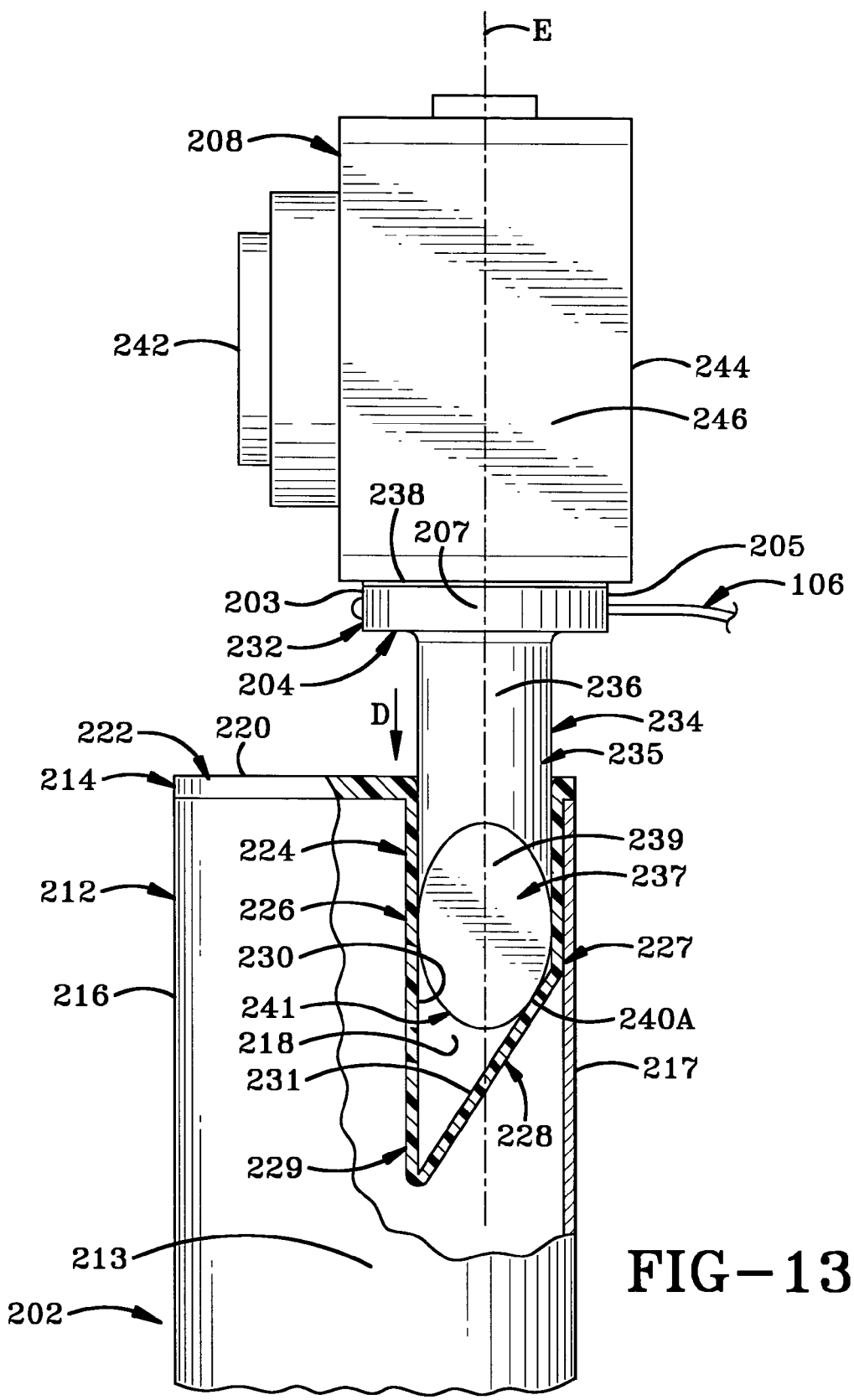
FIG. 13 is similar to FIG. 12 and shows the mounting member and article of merchandise having moved downwardly so that the post is disposed in the opening of the base and making initial contact with the angled camming wall of the base which bounds the opening.

FIG. 12 shows mounting member 204 with front 203 thereof facing toward first side 216 of column 212 and front 242 of camera 208 facing likewise. The user or potential customer returns mounting member 204 to its mounted position on base 202 with post 234 disposed in opening 218 by moving mounting member 204 and camera 208 downwardly as indicated at arrow D in FIG. 13. In the exemplary embodiment, this downward movement is linear parallel to a substantially vertical axis E which passes through the center of the post 234. FIG. 13 shows camming surface 240A at an initial point of engagement with upper surface 231 of bottom wall 228. Once post 234 is inserted within opening 218, the person handling camera 208 may simply release camera 208 and mounting member 204 and the force of gravity will pull member 204 and camera 208 further downwardly as indicated at arrow F in FIG. 14 as the camming engagement between camming surfaces 240A and 231 causes member 204 and camera 208 to rotate about axis E as indicated at arrow G whereby front 242 of camera 208 and front 203 of mounting member 204 move toward front 213 of column 212.

The combination of the downward movement and the rotational movement about axis E produces downwardly spiraling movement of member 204 and camera 208. During this movement, camming surface 240A slides downwardly and laterally along the angled inner surface 231 while outer surface 236 of side wall 235 of post 234 slidably engages inner surface 230 along side wall 226 of cup shaped member 224. Prior to the engagement of camming surface 240A and inner surface 231, this slidable engagement between surfaces 236 and 230 may simply be vertically downward in a linear fashion. Once camming surfaces 240 and 231 engage and cause the rotation of member 204 and camera 208, the sliding engagement between surfaces 236 and 230 includes the rotational movement and thus will also involve a downwardly spiraling slidable engagement therebetween. This downward spiraling movement continues until lower surface 239 of post 234 is seated in a mating fashion on upper surface 231 of mounting wall 228 at which time front 242 of camera 208 and front 203 of mounting member 204 are aligned with front 213 of column 212 and the associated rear portions and sides of these members are also respectively aligned. Thus, gravitational force moves member 204 and camera 208 downwardly and causes rotation via camming surfaces 240A and 231 to achieve the aligned display orientation of FIG. 15. No other force is required to achieve the display orientation which occurs automatically upon the release of camera 208 and member 204 with post 234 disposed within opening 218 of base 202.

Figure 14:
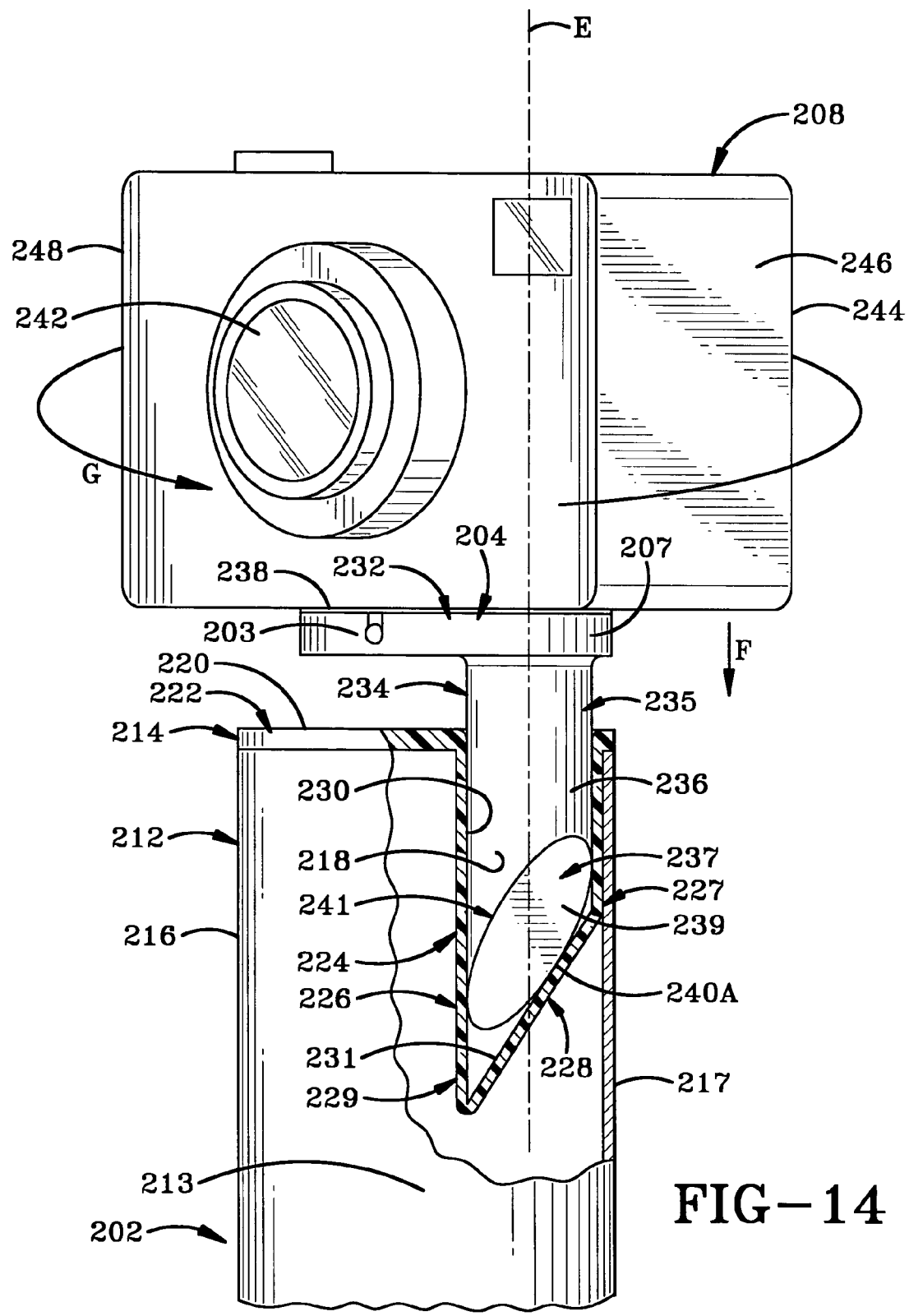
FIG. 14 is similar to FIG. 13 and shows the mounting member and article of merchandise rotating as they continue to move downwardly within the opening of the base.
Figure 15:
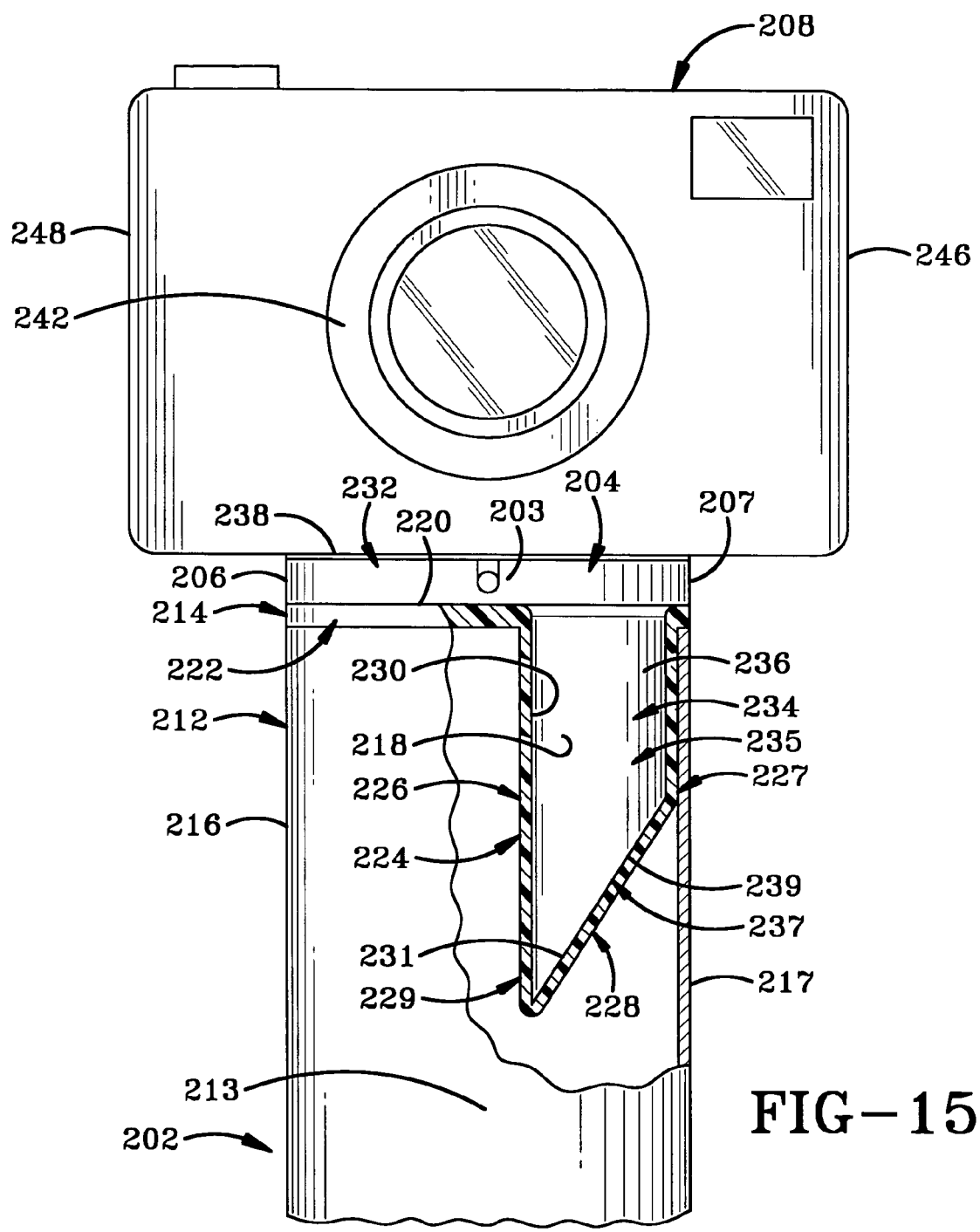
FIG. 15 is similar to FIG. 14 and shows the mounting member and article of merchandise having fully rotated and moved downwardly to the aligned display orientation.

Alternately, camming surface 240B may engage camming surface 231 to rotate member 204 and camera 208 about axis E in the opposite direction indicated by arrow G in FIG. 14.

Display stand 200 thus provides a simple alignment mechanism for moving mounting member 204 and merchandise such as camera 208 from an unaligned orientation to an aligned display orientation as described.

Referring to FIGS. 16-19, stand 300 is now described. Display stand 300 is similar to stand 100 in that it includes a base 302, a mounting member 304 and a tether 106. Base 302 includes an alarm 301 (FIG. 16), which may include an audible alarm and/or a visible alarm light. Base 302 is essentially the same as base 102 except that top of base 302 is horizontal like that of base 202 and base 302 eliminates the outwardly extending portion of plate 122 of base 102. Thus, mounting member 304 during the automatic orientation thereof rotates about a vertical axis H. Mounting member 304 is the distinguishing feature of stand 300 although it has some similar characteristics to mounting members 104 and 204. Mounting member 304 moves in the same fashion as mounting member 104 via the interaction of magnets 140 (FIG. 23) and 142 (FIG. 3) when mounting member 304 is mounted on base 102 except that mounting member 304 rotates about vertical axis H.

In short, mounting member 304 is configured to allow camera 208 or another display item to be adjusted or moved relative to mounting member 304 between a plurality of display positions, which is particularly useful in the centering of the display item to produce a desirable aesthetic display and for better balancing the display item on mounting member 304, and on base 102 when mounting member 304 is mounted thereon. It is well known that many cameras have internally threaded mounting holes for mounting the camera on tripods and the like, and that these mounting holes are often off center. Thus, mounting member 304 is particularly useful for displaying such cameras and other display items having off center mounting locations.

In order to provide the adjusting movements of camera 208, mounting member 304 includes a first lower mounting element 306 and a second upper mounting element 308 (FIGS. 19 and 21-24) which is moveably mounted on upper element 306. Broadly, lower element 306 is configured to mount on base 102 and upper element 308 is configured to mount on camera 208 so that the adjustment of element 308 with respect to element 306 moves camera 208 a selected display position.

Figure 19:
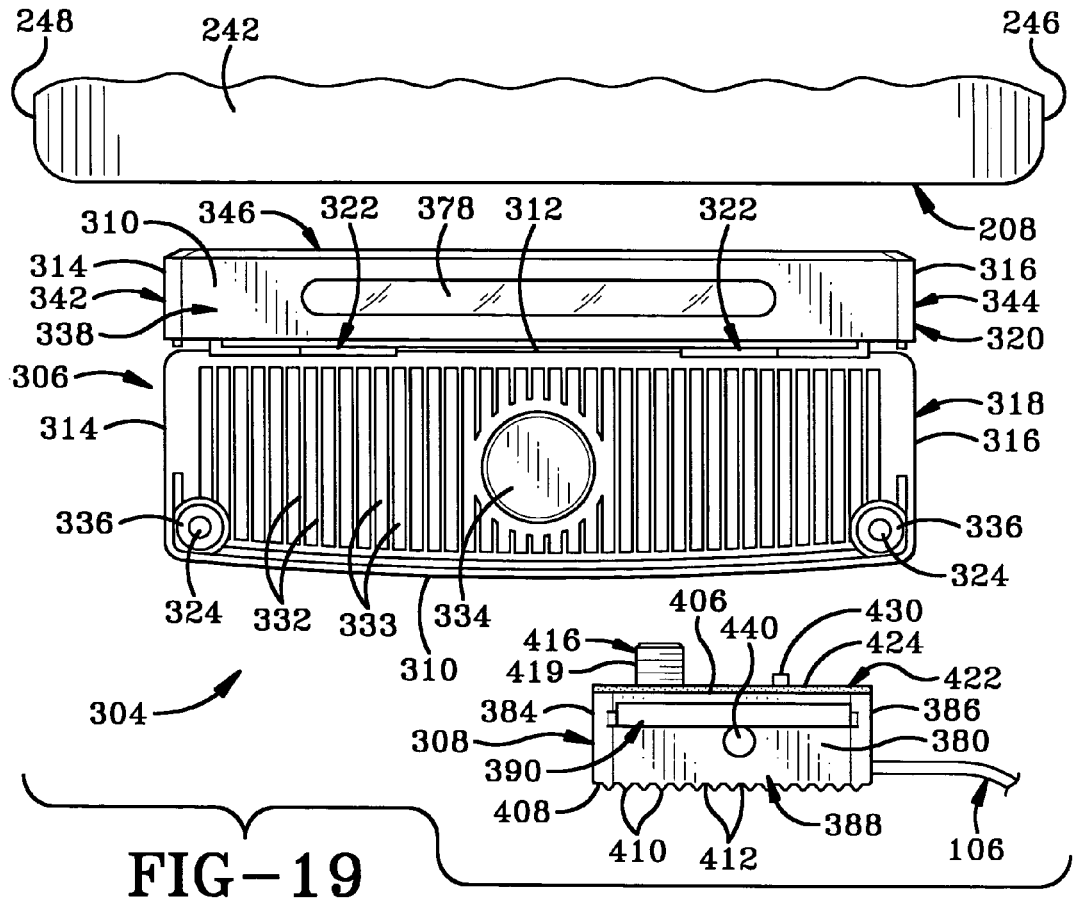
FIG. 19 is a partially exploded view showing a lower portion of the camera and the mounting member removed therefrom with the first mounting element in an open position and the second mounting element removed from within the first mounting element. More particularly.

Referring to FIGS. 16-20, lower mounting element 306 has a front 310, an opposed rear 312, and first and second opposed ends or sides 314 and 316. Lower element 306 is a generally hollow structure and thus forms a housing which includes a base 318 and a lid 320 pivotally mounted thereon via a pair of hinges 322. In the secured position shown in FIGS. 1-3, base 318 and lid 320 are secured to one another by a pair of fasteners in the form of screws 324 (FIG. 18-19). Base 318 includes a generally flat and rectangular wall 326 which is substantially horizontal when mounted on base 302. Base 318 further includes a post 328 which is connected to and extends downwardly from wall 326. Post 328 is similar to post 134 of stand 100 and houses magnet 140 (FIG. 23) for providing the automatic orienting movement of mounting member 304 when mounted on base 302. More particularly, post 328 is centered between first and second ends 314 and 316 of lower element 306, as best seen in FIG. 18. As previously noted, mounting member 304 rotates about axis H, which in FIG. 18 also represents the center line between sides 314 and 316, being equidistant from each of said sides. In the display position of camera 208 shown in FIG. 18, center line H is aligned with a center line J of camera 208, which is disposed between and equidistant from sides 246 and 248 thereof. Thus, side 248 of camera 208 overhangs or extends outwardly of side 314 of mounting member 308 by a distance which is equal to that by which side 316 is overhung by side 246 of camera 208. As previously noted with regard to many cameras, camera 208 defines a threaded hole 330 which extends upwardly from the bottom thereof and which is off center between sides 246 and 248 thereof. More particularly, side 248 of camera 208 and hole 330 define a distance D1 therebetween and side 246 and hole 330 define a distance D2 therebetween which is smaller than distance D1.

Figure 20:
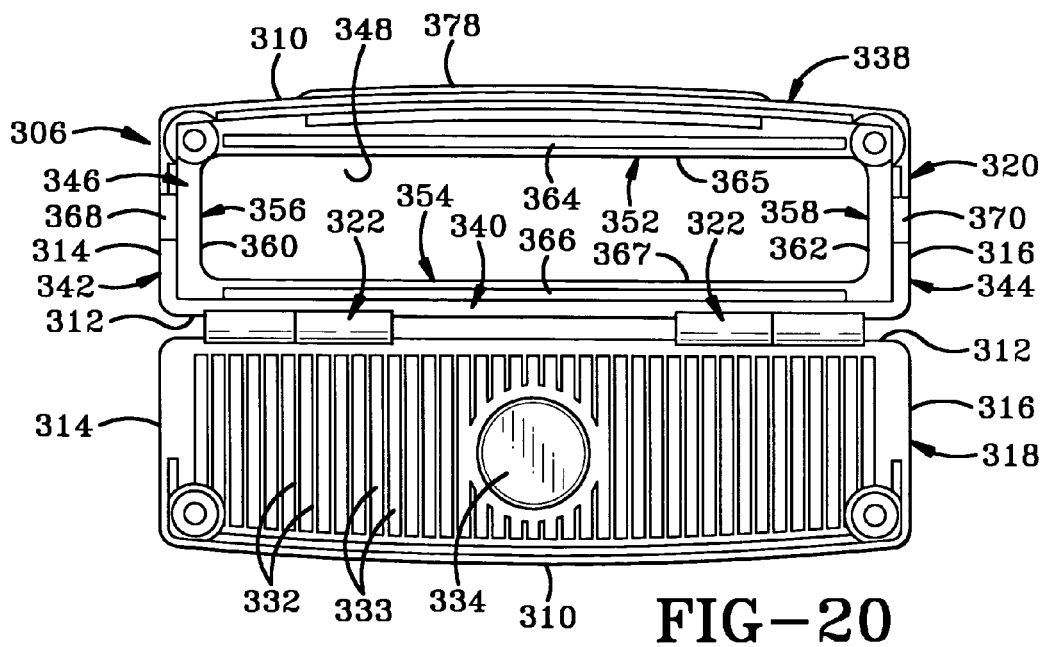
FIG. 20 shows the first mounting element in a more fully open position so that the lid is seen in a bottom plan view and the base is seen in a top plan view.

With reference to FIGS. 19 and 20, base 318 further includes a plurality of upwardly extending projections in the form of ridges 332. Each adjacent pair of ridges 332 defines therebetween a recess 333 which is elongated in the axial direction. In the present embodiment, base 318 includes a series of over thirty ridges which are parallel to one another and extend in an axial direction defined between front 310 and rear 312 of mounting member 304. Ridges 332 are thus spaced from one another in a longitudinal direction defined between sides 314 and 316 of mounting member 304. Ridges 332 are provided along nearly the entire length of wall 326. A retaining member 334 is connected to wall 326 within an opening defined therein directly above and in contact with magnet 140 (FIG. 23) in order to retain said magnet in its position within post 328. Retaining washers 336 are disposed atop wall 326 and respectively engage screws 324 to retain screws 324 on base 318 when base 318 and lid 320 are in the open position.

Lid 320 includes a front wall 338, a rear wall 340, and first and second side walls 342 and 344 which extend between and are connected to front and rear walls 338 and 340. Lid 320 also includes a top wall 346 which extends inwardly from each of walls 338, 340, 342 and 344 a relatively, short distance to define an elongated opening 348 which communicates with an interior chamber 350 (FIG. 23) defined between base 318 and lid 320 in the closed position. More particularly, top wall 346 includes a front portion 352, a rear portion 354, and first and second side portions 356 and 358 which are connected to and extend respectively inwardly from front wall 338, wall 340, first side wall 342 and second side wall 344. First side portion 356 has a first inwardly facing surface 360 which serves as a first stop. Likewise, second side portion 358 has a second inwardly facing surface 362 which serves as a second stop. Surfaces 360 and 362 serve as the ends of opening 348, between which opening 348 is elongated in the longitudinal direction.

Front portion 352 defines a front channel 364 which is elongated in the longitudinal direction and is nearly as long as opening 348. Likewise, rear portion 354 defines a rear channel 356 which is parallel to channel 364 and of the same length. Channel 364 extends upwardly from the lower surface of front portion 352 and rear channel 366 likewise extends upwardly from the lower surface of rear portion 354. Front portion 352 includes a downwardly extending front projection 365 which is disposed inwardly of and bounds channel 364. Front projection 365 also bounds opening 348. Likewise, rear portion 354 includes a downwardly extending rear projection 367 which is disposed inwardly of and bounds rear channel 366. Projection 367 also bounds opening 348.

First side wall 342 defines a downwardly opening arch 368 and second side wall 344 likewise defines a downwardly opening arch 370. In the closed position, bottom wall 326 of base 318 cooperates with arch 368 to form a first tether-receiving through hole 372 (FIG. 23) which serves as an entrance opening in communication with interior chamber 350. Likewise, wall 326 cooperates with arch 370 in the closed position to define a second tether-receiving through hole 374 which likewise serves as an entrance opening in communication with interior chamber 350. In the position of upper mounting element 308 shown in FIG. 23, tether 106 adjacent one end thereof passes through second through hole 374, is slidably received therein and is connected to element 308. Front wall 338 includes a window which includes a slot 376 (FIG. 24) which is formed in wall 338 and is elongated in the longitudinal direction and which communicates with interior chamber 350. The window includes a transparent or translucent lens 378 which is disposed in slot 376 and is elongated in the longitudinal direction.

With reference to FIGS. 19 and 21-25, upper mounting element 308 is now described. Upper element 308 includes a body 388 with a front wing 390 extending axially outwardly therefrom in the forward direction. Likewise, a rear wing 392 extends axially outwardly from body 388 in the rearward direction. Wings 390 and 392 are elongated in the longitudinal direction, extend nearly the entire length of element 308 and are parallel to one another. Front wing 390 includes an outwardly extending arm 394 which extends axially outwardly in the forward direction from body 388. Wing 390 also includes an upwardly extending projection 396 (FIGS. 22, 24) which is connected to and extends upwardly from arm 394 so that body 388, arm 394 and projection 396 define therebetween an upwardly opening channel 398 which is elongated in the longitudinal direction and is open on either end thereof so that channel 398 is suited to receive therein front projection 365 of front portion 352 of stop wall 346. Similarly, rear wing 392 includes a laterally extending arm 400 which extends axially outward from body 388 in a rearward direction with a projection 402 extending upwardly therefrom so that body 388, arm 400 and projection 402 define therewith a channel 404 which opens upwardly and has open ends in order to receive therein rear projection 367 of rear portion 354 of top wall 346. Thus, each of projections 396, 365, 367 and 402 are slidably received within respective channels 364, 398, 404 and 366 so that upper element 308 slidably engages top wall 346 of lid 320 during the sliding movement of element 308 relative to element 306 between the various display positions of element 308.

Figure 23:
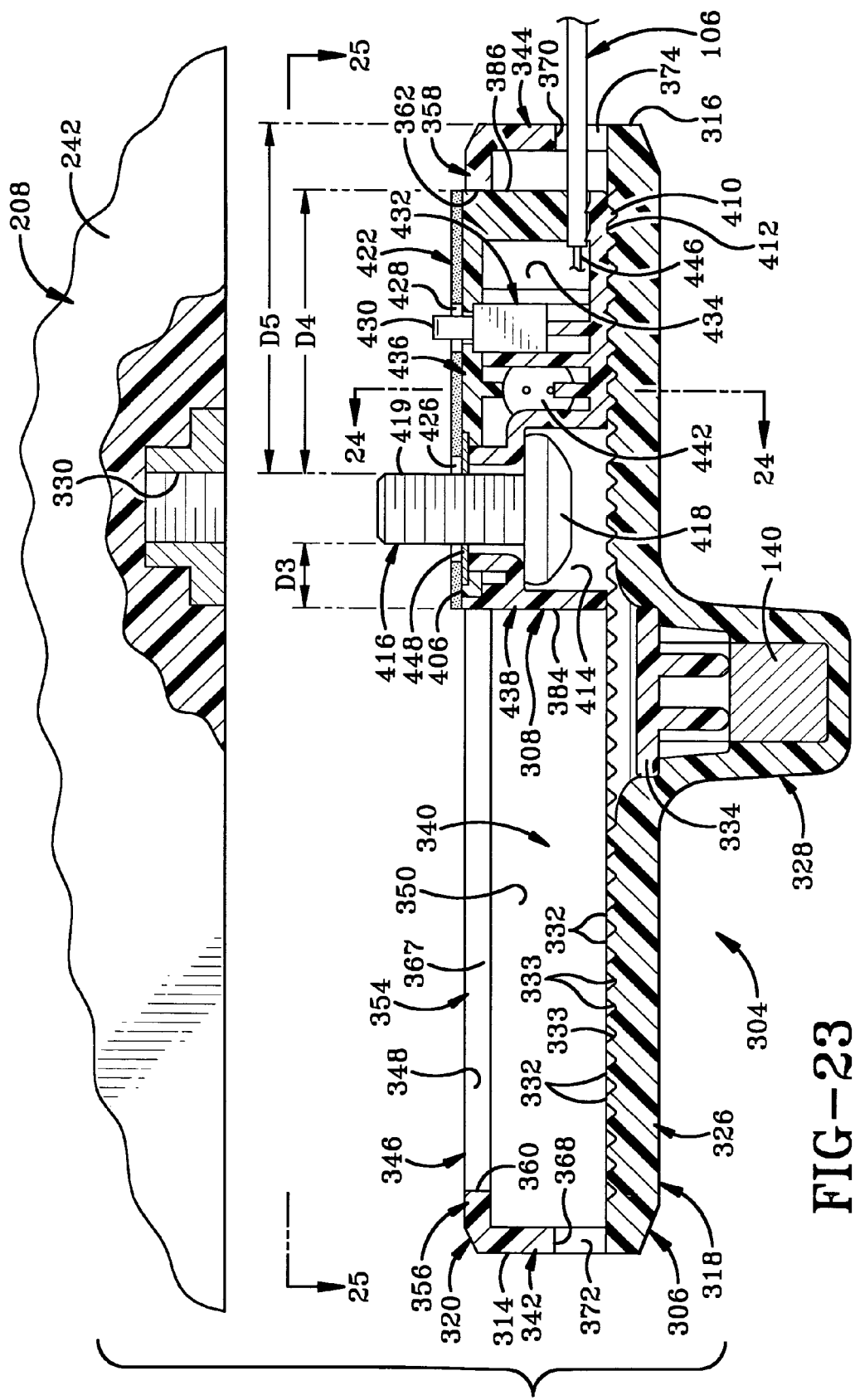
FIG. 23 is a sectional view of the mounting member taken from the front when the first and second mounting elements are assembled and shows the lower portion of the camera with portions in section to show the internally threaded mounting location of the camera.

Body 388 has a top 406 and bottom 408. Body 388 includes a plurality of downwardly extending projections in the form of ridges 410 which are disposed along bottom 408 and which define therebetween respective recesses 412. As shown in FIG. 23, ridges 410 and recesses 412 are of a mating configuration respectively with recesses 333 and ridges 332 of wall 326. Ridges 410 and recesses 412 thus extend axially all the way across bottom 408 of body 388 except where interrupted by a screw receiving hole 414 which extends from bottom 408 to top 406 and receives therein a fastener in the form of a screw 416. More particularly, hole 414 is a counter bore hole suited to receive an enlarged head 418 of screw 416. Head 418 includes a tool engaging portion 420 (FIG. 21) shown in the present embodiment as a star-shaped depression for receiving a star wrench. A retaining washer 448 (FIG. 25) is used to retain screw 416 on body 388 of mounting element 308. Screw 416 is off center in the longitudinal direction, being closer to first side 384 than second side 386 as indicated by distance D3 and distance D4, which is greater than D3 (FIG. 23).

A layer of padding 422 is connected to top 406 of body 388 and has a substantially flat upper surface 424. As shown in FIG. 23, padding 422 defines a first hole 426 for receiving therethrough a threaded portion 419 of screw 416, which extends upwardly of upper surface 424. Padding 422 also defines a second hole 428 in which a plunger 430 of a plunger switch 432 is disposed so that plunger 430 extends upwardly of upper surface 424 of padding 422 when plunger 430 is not depressed. Switch 432 is disposed within an interior chamber 434 of mounting element 308. More particularly, second mounting element 308 includes upper and lower members 436 and 438 (FIGS. 23-24) which are connected to one another to define interior chamber 434. Upper and lower members 436 and 438 when connected clamp tether 106 therebetween to secure tether 106 to body 388.

Also disposed within interior chamber 434 are first and second lights 440 and 442 which in the configuration shown in FIG. 24 are respectively front and rear lights. Each of lights 440 and 442 extend from within interior chamber 434 outwardly so that a portion of each light is disposed outwardly of body 388 and within interior chamber 350 of first mounting element 306. First light 440 is directed toward lens 378 and when lit emits light rays in the direction of and through lens 378 so that light rays are externally visible. Light 440 thus serves as an arming indicator light which is lit when plunger 430 is depressed. Each of lights 440 and 442 includes a pair of electrical connections 444 which are appropriately configured to be in electrical communication with electrical conductors 446 (FIG. 22) of tether 106 and with switch 432. Padding 422 is typically formed of an elastomer or other compressible material and is usually in the form of a foam. The lower layer of padding 422 is adhered to the upper surface of body 388 by an adhesive and the upper surface of padding 422 may include an adhesive if desired although the lack of such an adhesive allows padding 422 to be reusable with other display items.

Figure 26:
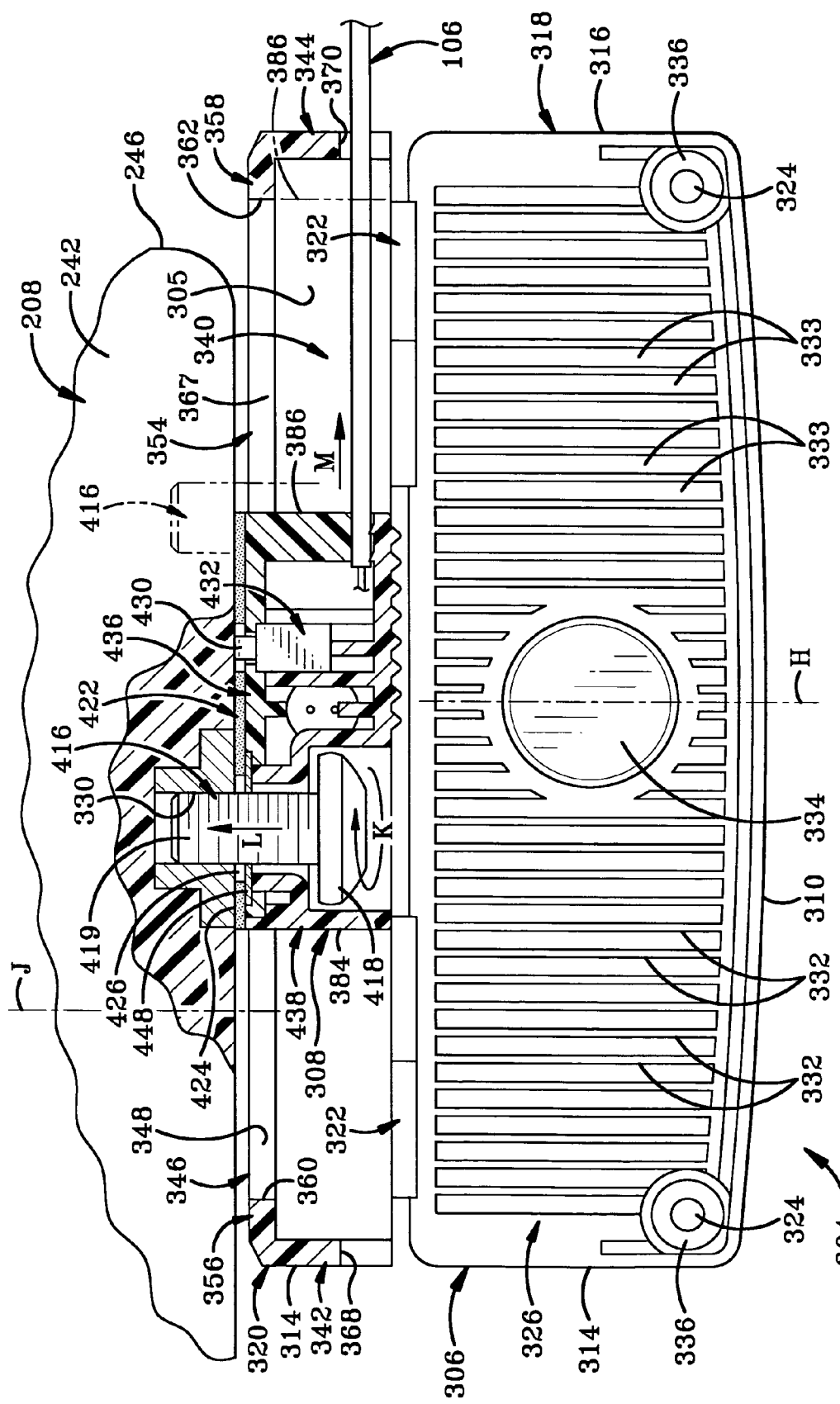
FIG. 26 is a view showing the camera, second mounting element and the lid of the first mounting element in a fashion similar to FIG. 23 with the second mounting element connected to the camera with the mounting screw partially tightened.
Figure 27:
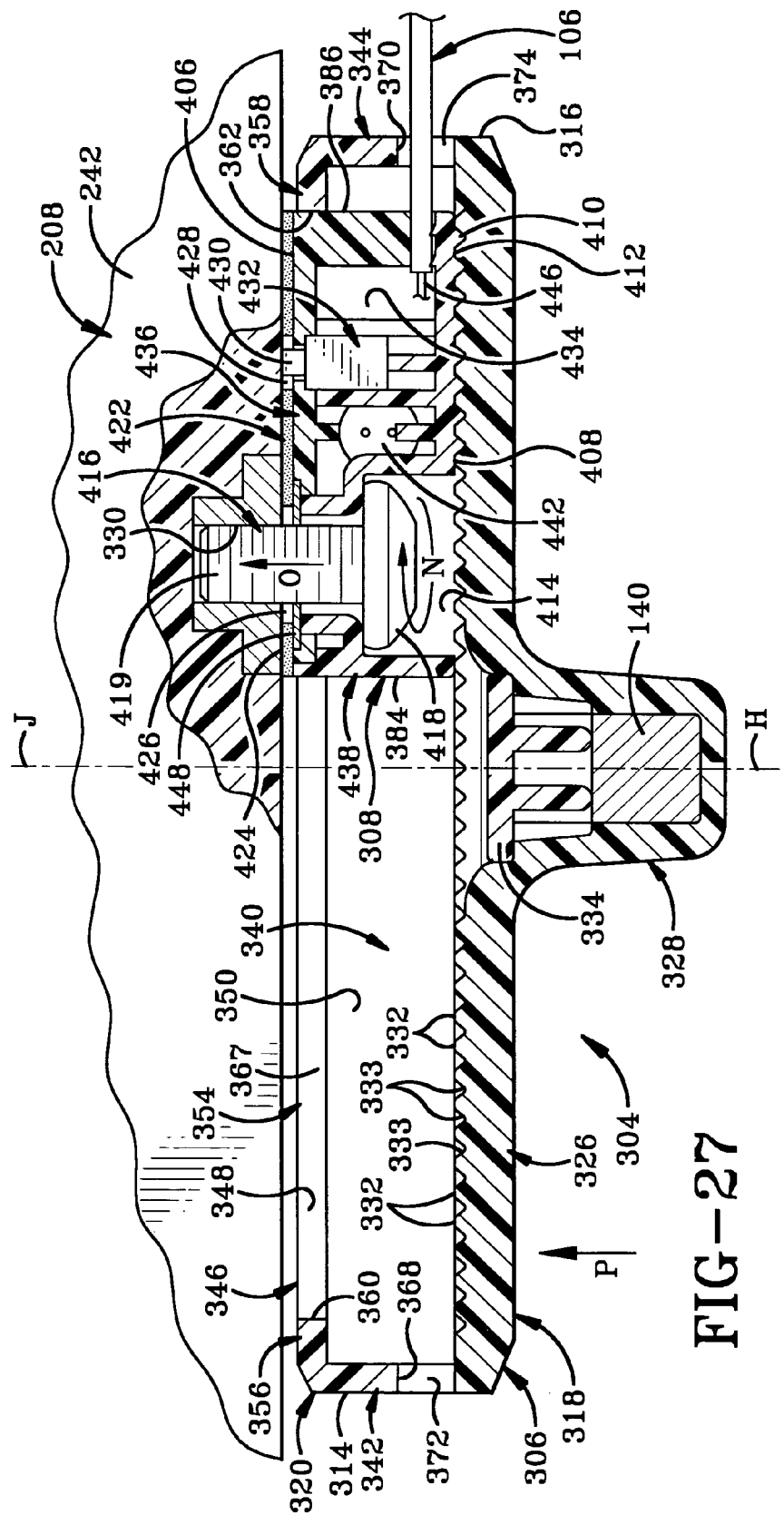
FIG. 27 is similar to FIG. 23 and shows the mounting member connected to the camera with the mounting screw fully tightened, the base and lid closed, and the first mounting element adjacent one end of the second mounting element and abutting a stop thereof.

In operation, mounting member 304 is moved to the open position shown in FIG. 19 by loosening screws 324 and pivoting base 318 and lid 320 open. Screw 416 is then aligned with threaded hole 330 and is rotated (Arrow K in FIG. 26) to threadedly engage camera 208 and move upwardly therein (Arrow L) to secure mounting member 304 to camera 208. At this point, screw 416 is only partially tightened so that camera 208 and padding 422 may or may not be spaced from one another, and so that element 308 is still slidable on element 306. In this partially tightened state, camera 208 and upper element 308 are then slid in a linear fashion relative to lower element 306 to a desired display position with relation to lower element 308. Typically, this sliding movement of camera 208 and upper element 308 moves them from an unaligned off center position, as shown by the unaligned center lines J and H, to the centered display position previously described, as shown in phantom in FIG. 26. Screw. 416 is then tightened (Arrows N and O in FIG. 27) so that the upper surface of the padding 422 abuts the lower surface of camera 208. When screw 416 is fully tightened, the frictional engagement between elements 306 and 308 tends to prevent or substantially limit sliding movement therebetween. Base 318 and lid 320 are then pivoted about hinges 322 toward one another (Arrow P in FIG. 27) so that screws 324 (FIG. 26) may be tightened to secure base 318 and lid 320 to one another. The tightening of screws 324 secures mounting element 308 in a fixed position relative to mounting element 306 via the engagement of ridges 332 and 410.

As screw 416 is tightened, the lower surface of camera 208 depresses plunger 430 to close a circuit in order to arm alarm 301 and to turn on lights 440 and 442 to indicate that alarm 301 is armed. As with the previous embodiments, alarm 301 is activated if the sense loop of stand 300 is compromised, such as by the disconnection or severing of tether 106, or movement of camera 208 sufficiently away from mounting element 308 so that plunger 430 moves to an extended position.

Figure 28:
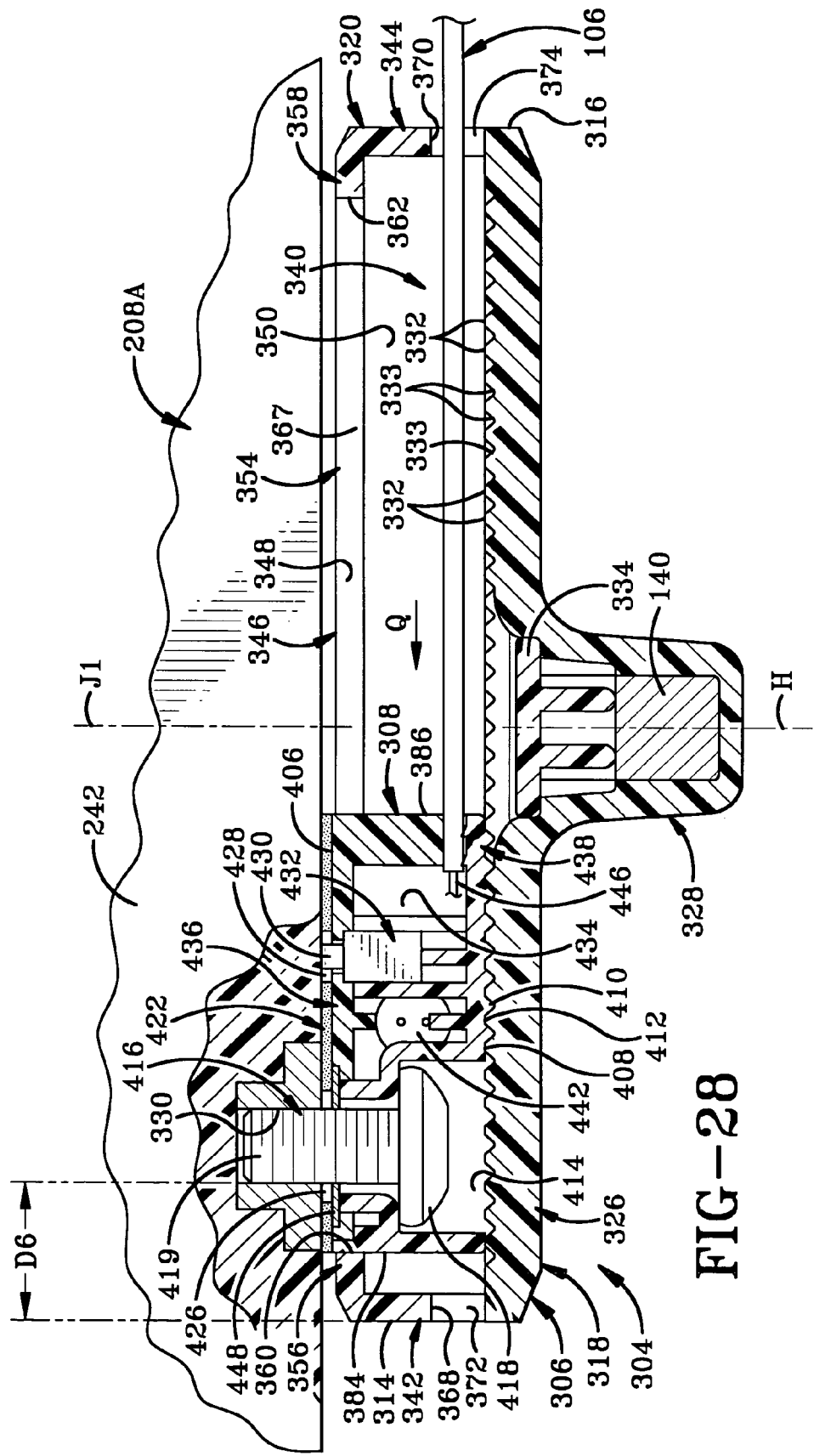
FIG. 28 is similar to FIG. 27 and shows the mounting member in use with an alternate camera, the first mounting element having moved to the other end of the second mounting element and abutting another stop thereof.

FIG. 28 shows mounting member 304 in use with an alternate camera 208A having a center line J1 and a mounting location in the form of a threaded hole 330 which is off center from center line J1 in a direction opposite that of camera 208. Arrow Q in FIG. 28 shows that upper element 308 has been moved from the position shown in FIG. 27, in which side 386 thereof abuts stop 362, to its extreme opposite position in which side 384 abuts stop 360. In the position of upper element 308 shown in FIG. 28, screw 416 and first side 314 of lower element 306 define therebetween a distance D6 which is shorter than distance D5 which is illustrated in FIG. 23. The off center position of screw 416 creates this difference in distances D5 and D6 while allowing for the space needed to mount switch 432 and lights 440 and 442 within upper element 308. During the movement of upper element 308 from the position shown in FIG. 27 to the position shown in FIG. 28, tether 106 slides through hole 374 of lower element 306. FIG. 28 thus illustrates the ability to use mounting member 304 with an alternate camera or other display item in which the mounting location or hole 330 is at a different location with respect to the sides of the display item or its center line while allowing for the centering or other desirable positioning of the display item relative to lower element 306.

Figure 29:
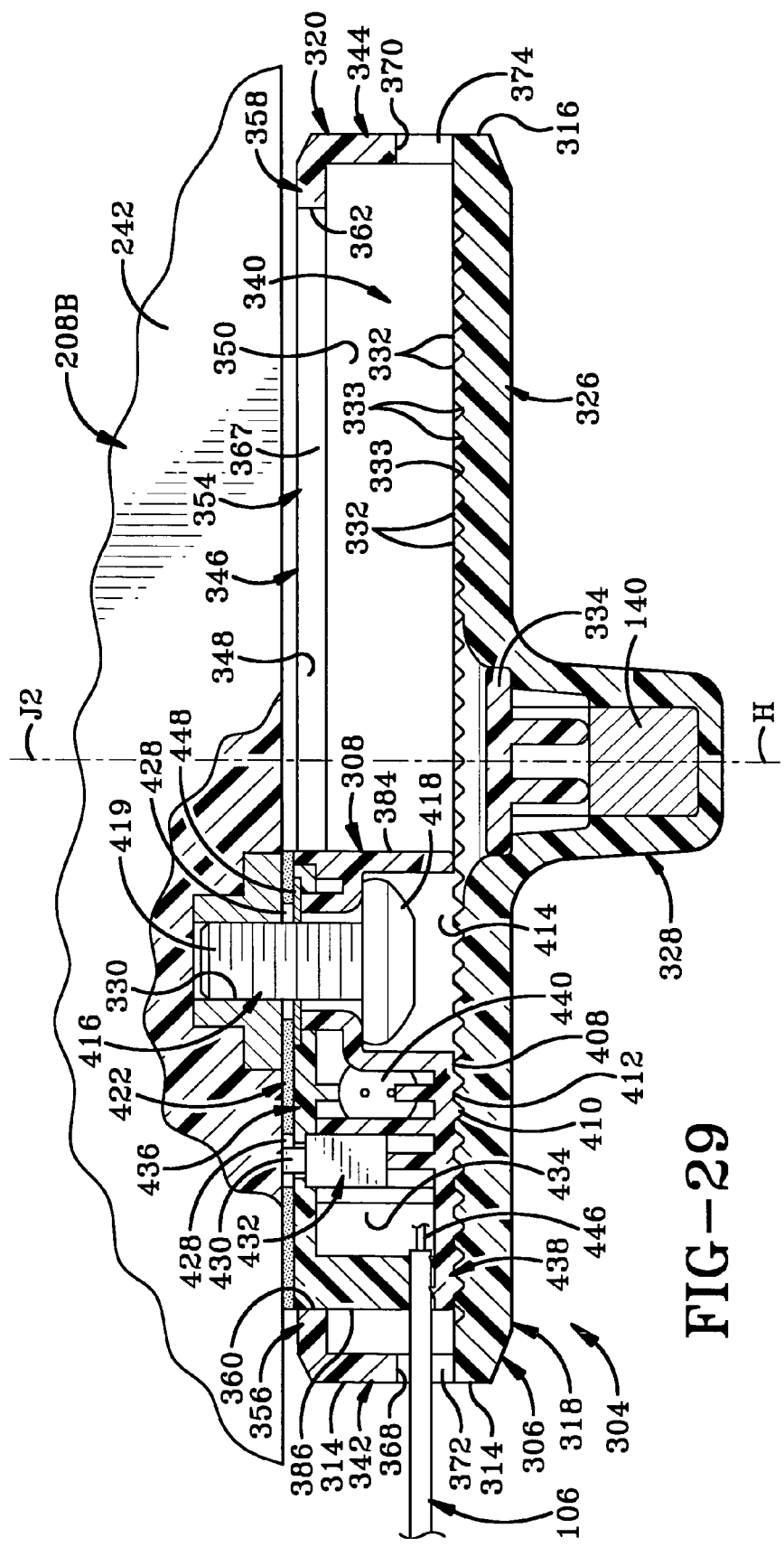
FIG. 29 is similar to FIG. 27 and shows the mounting member in use with another camera with the second mounting element in a reversed position within the first mounting element so that the tether passes through the entrance opening opposite that shown in FIG. 27.

FIG. 29 shows mounting member 304 in use with another alternate camera 208B having a centerline J2 and a mounting location in the form of a threaded hole 330 which is off center from centerline J2 in a direction opposite that of camera 208. As FIG. 29 shows, mounting element 308 is in a reversed orientation with respect to that shown in the previous figures so that first side 384 of element 308 faces second side 316 of element 306 and second side 386 faces first side 314 so that tether 106 passes through hole 372. Thus, light 440 faces rearwardly and light 442 (not shown in FIG. 29) faces forward. In addition, the reverse orientation allows for a different positioning of screw 416 due to its being offset within body 388 of element 308. For certain display items, the offset nature of screw 416 allows for the mounting on those display items in the reverse orientation of element 308 when this would not be possible in the standard position shown in the previous figures. In addition, it may be desirable to have tether 106 extend outwardly from element 306 on one side as opposed to the other depending on the area in which stand 300 is used. The reversible nature of element 308 allows for this possibility. As noted above, light 442 faces forward and this is represented in phantom in FIG. 18. The phantom representation also represents light 440 when upper element 308 is in the non-reversed position and light 440 is positioned closer to end 314 than to end 316, as in FIG. 28.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A device for displaying a display item having an item mounting location, the device comprising:
   a mounting member comprising:
   a first mounting element having first and second opposed sides and a longitudinal direction extending from the first side to the second side;
   a second mounting element comprising a first mounting location adapted to connect to the item mounting location;
   wherein the second mounting element is movably mounted on the first mounting element to move selectively back and forth in the longitudinal direction relative to the first mounting element between a plurality of display positions whereby the display item when connected to the second mounting element at the first mounting location must move back and forth in the longitudinal direction with the second mounting element as the second mounting element moves respectively back and forth in the longitudinal direction relative to the first mounting element; and;
   an arming sensor configured for arming an alarm when the display item is connected to the second mounting element;
   wherein one of the first and second mounting elements further comprises a window having an elongated direction; and further comprising a light carried by the other of the first and second mounting elements; wherein the light is movable in the elongated direction adjacent the window.

2. The device of claim 1 wherein the second mounting element is slidably movable between the display positions.

3. The device of claim 2 further comprising at least one first projection carried by one of the first and second mounting elements and engageable with the other of the first and second mounting elements to selectively prevent the second mounting element from sliding.

4. The device of claim 3 wherein the at least one first projection comprises a plurality of ridges.

5. The device of claim 1 wherein the first mounting element comprises a base and a lid which is movable between open and closed positions;
   wherein the second mounting element is movable between the display positions when the lid is in the open position; and
   wherein the base and lid secure the second mounting element in one of the display positions when the lid is in the closed position.

6. The device of claim 1 further comprising:
   a base on which the mounting member is mountable and movable relative thereto between an unaligned orientation and an aligned display orientation; and
   an alignment mechanism for automatically moving the mounting member from the unaligned orientation to the aligned display orientation.

7. The device of claim 1 further comprising a base; and wherein the mounting member is movable between a mounted position in which the mounting member is in contact with the base and a removed position in which the mounting member is movable so that the mounting member is adapted to facilitate viewing and handling of the display item.

8. The device of claim 7 further comprising a tether connected to the mounting member and the base.

9. The device of claim 1 further comprising a base on which the mounting member is rotatably mounted.

10. The device of claim 9 wherein the mounting member is rotatable relative to the base between an unaligned orientation and an aligned display orientation; and further comprising an alignment mechanism for automatically rotating the mounting member from the unaligned orientation to the aligned display orientation.

11. The device of claim 1 in combination with the display item.

12. A device for displaying a display item having an item mounting location, the device comprising:
    a mounting member comprising:
    a first mounting element having first and second opposed sides and a longitudinal direction extending from the first side to the second side;

a second mounting element comprising a first mounting location adapted to connect to the item mounting location;

wherein the second mounting element is movably mounted on the first mounting element to move selectively back and forth in the longitudinal direction relative to the first mounting element between a plurality of display positions whereby the display item when connected to the second mounting element at the first mounting location must move back and forth in the longitudinal direction with the second mounting element as the second mounting element moves respectively back and forth in the longitudinal direction relative to the first mounting element; and;

an arming sensor configured for arming an alarm when the display item is connected to the second mounting element;

wherein the first mounting element defines an interior chamber; and further comprising:

a light which is carried by the second mounting element within the interior chamber and is externally visible; and an electrical wire electrically communicating with the light and extending outwardly from the first and second mounting elements.

13. The device of claim 12 wherein the second mounting element is slidably movable between the display positions.

14. The device of claim 13 further comprising at least one first projection carried by one of the first and second mounting elements and engageable with the other of the first and second mounting elements to selectively prevent the second mounting element from sliding.

15. The device of claim 14 wherein the at least one first projection comprises a plurality of ridges.

16. The device of claim 12 wherein the first mounting element comprises a base and a lid which is movable between open and closed positions;

wherein the second mounting element is movable between the display positions when the lid is in the open position; and wherein the base and lid secure the second mounting element in one of the display positions when the lid is in the closed position.

17. The device of claim 12 further comprising:

a base on which the mounting member is mountable and movable relative thereto between an unaligned orientation and an aligned display orientation; and an alignment mechanism for automatically moving the mounting member from the unaligned orientation to the aligned display orientation.

18. The device of claim 12 further comprising a base; and wherein the mounting member is movable between a mounted position in which the mounting member is in contact with the base and a removed position in which the mounting member is movable so that the mounting member is adapted to facilitate viewing and handling of the display item.

19. The device of claim 18 further comprising a tether connected to the mounting member and the base.

20. The device of claim 12 further comprising a base on which the mounting member is rotatably mounted.

21. The device of claim 20 wherein the mounting member is rotatable relative to the base between an unaligned orientation and an aligned display orientation; and further comprising an alignment mechanism for automatically rotating the mounting member from the unaligned orientation to the aligned display orientation.

22. The device of claim 12 in combination with the display item.

23. A device for displaying a display item having an item mounting location, the device comprising:

a mounting member comprising:

a first mounting element having first and second opposed sides and a longitudinal direction extending from the first side to the second side;

a second mounting element comprising a first mounting location adapted to connect to the item mounting location;

wherein the second mounting element is movably mounted on the first mounting element to move selectively back and forth in the longitudinal direction relative to the first mounting element between a plurality of display positions whereby the display item when connected to the second mounting element at the first mounting location must move back and forth in the longitudinal direction with the second mounting element as the second mounting element moves respectively back and forth in the longitudinal direction relative to the first mounting element; and;

an arming sensor configured for arming an alarm when the display item is connected to the second mounting element;

further comprising an electric plunger switch having a depressible plunger extending outwardly from the second mounting element and adapted to be depressed by the display item.

24. The device of claim 23 wherein the second mounting element is slidably movable between the display positions.

25. The device of claim 24 further comprising at least one first projection carried by one of the first and second mounting elements and engageable with the other of the first and second mounting elements to selectively prevent the second mounting element from sliding.

26. The device of claim 25 wherein the at least one first projection comprises a plurality of ridges.

27. The device of claim 23 wherein the first mounting element comprises a base and a lid which is movable between open and closed positions;

wherein the second mounting element is movable between the display positions when the lid is in the open position; and wherein the base and lid secure the second mounting element in one of the display positions when the lid is in the closed position.

28. The device of claim 23 further comprising:

a base on which the mounting member is mountable and movable relative thereto between an unaligned orientation and an aligned display orientation; and an alignment mechanism for automatically moving the mounting member from the unaligned orientation to the aligned display orientation.

29. The device of claim 23 further comprising a base; and wherein the mounting member is movable between a mounted position in which the mounting member is in contact with the base and a removed position in which the mounting member is movable so that the mounting member is adapted to facilitate viewing and handling of the display item.

30. The device of claim 29 further comprising a tether connected to the mounting member and the base.

31. The device of claim 23 further comprising a base on which the mounting member is rotatably mounted.

32. The device of claim 31 wherein the mounting member is rotatable relative to the base between an unaligned orientation and an aligned display orientation; and further comprising an alignment mechanism for automatically rotating the mounting member from the unaligned orientation to the aligned display orientation.

33. The device of claim 23 in combination with the display item.

34. A device for displaying a display item having an item mounting location, the device comprising:
a mounting member comprising:
a first mounting element having first and second opposed sides and a longitudinal direction extending from the first side to the second side;
a second mounting element comprising a first mounting location adapted to connect to the item mounting location;
wherein the second mounting element is movably mounted on the first mounting element to move selectively back and forth in the longitudinal direction relative to the first mounting element between a plurality of display positions whereby the display item when connected to the second mounting element at the first mounting location must move back and forth in the longitudinal direction with the second mounting element as the second mounting element moves respectively back and forth in the longitudinal direction relative to the first mounting element; and
an arming sensor configured for arming an alarm when the display item is connected to the second mounting element;
wherein the second mounting element is selectively positionable on the first mounting element in first and second orientations which are the reverse of one another;
wherein the first mounting element comprises a window; and further comprising:
first and second lights carried by the second mounting element;
wherein the first light is disposed adjacent the window when the second mounting element is in the first orientation; and
wherein the second light is disposed adjacent the window when the second mounting element is in the second orientation.

35. A device for displaying a display item having an item mounting location, the device comprising:
a mounting member comprising:
a first mounting element having first and second opposed sides and a longitudinal direction extending from the first side to the second side;
a second mounting element comprising a first mounting location adapted to connect to the item mounting location;
wherein the second mounting element is movably mounted on the first mounting element to move selectively back and forth in the longitudinal direction relative to the first mounting element between a plurality of display positions whereby the display item when connected to the second mounting element at the first mounting location must move back and forth in the longitudinal direction with the second mounting element as the second mounting element moves respectively back and forth in the longitudinal direction relative to the first mounting element; and;
an arming sensor configured for arming an alarm when the display item is connected to the second mounting element;
wherein the second mounting element is selectively positionable on the first mounting element in first and second orientations which are the reverse of one another;
wherein the first mounting element defines first and second opposed entrance openings; and further comprising:
an electrical conductor which is connected to the second mounting element; and
wherein the conductor passes through the first entrance opening when the second mounting element is in the first orientation and through the second entrance opening when the second mounting element is in the second orientation.

36. The device of claim 35 wherein the second mounting element is slidably movable between the display positions.

37. The device of claim 36 further comprising at least one first projection carried by one of the first and second mounting elements and engageable with the other of the first and second mounting elements to selectively prevent the second mounting element from sliding.

38. The device of claim 37 wherein the at least one first projection comprises a plurality of ridges.

39. The device of claim 35 wherein the first mounting element comprises a base and a lid which is movable between open and closed positions;
wherein the second mounting element is movable between the display positions when the lid is in the open position; and
wherein the base and lid secure the second mounting element in one of the display positions when the lid is in the closed position.

40. The device of claim 35 further comprising:
a base on which the mounting member is mountable and movable relative thereto between an unaligned orientation and an aligned display orientation; and
an alignment mechanism for automatically moving the mounting member from the unaligned orientation to the aligned display orientation.

41. The device of claim 35 further comprising a base; and wherein the mounting member is movable between a mounted position in which the mounting member is in contact with the base and a removed position in which the mounting member is movable so that the mounting member is adapted to facilitate viewing and handling of the display item.

42. The device of claim 41 further comprising a tether connected to the mounting member and the base.

43. The device of claim 35 further comprising a base on which the mounting member is rotatably mounted.

44. The device of claim 43 wherein the mounting member is rotatable relative to the base between an unaligned orientation and an aligned display orientation; and further comprising an alignment mechanism for automatically rotating the mounting member from the unaligned orientation to the aligned display orientation.

45. The device of claim 35 in combination with the display item.

* * * * *